(12) United States Patent
Inoue et al.

(10) Patent No.: US 6,187,358 B1
(45) Date of Patent: Feb. 13, 2001

(54) METHOD OF AND APPARATUS FOR PRODUCING EXTRUDED ELONGATE PASTA OF SUBSTANTIALLY EVEN LENGTHS

(75) Inventors: Yoshiteru Inoue, Otsu; Kenkichi Morishita, Ibaraki; Shigeki Nashida, Kusatsu; Hiroshi Moriyasu, Kurita-gun, all of (JP)

(73) Assignee: Nisshi Food Products Co., Ltd., Osaka (JP)

( * ) Notice: Under 35 U.S.C. 154(b), the term of this patent shall be extended for 0 days.

(21) Appl. No.: 09/256,419

(22) Filed: Feb. 25, 1999

(30) Foreign Application Priority Data

Apr. 9, 1998 (JP) ................................... 10-097544

(51) Int. Cl.⁷ ................................. A21C 5/00; A21L 1/00
(52) U.S. Cl. ........................ 426/503; 425/308; 425/316; 426/516; 426/518; 426/557
(58) Field of Search ..................................... 426/503, 516, 426/518, 557; 425/308, 316, 215, 216

(56) References Cited

U.S. PATENT DOCUMENTS

| 4,675,199 | * | 6/1987 | Hsu | ....................................... | 426/516 |
| 5,425,959 | * | 6/1995 | Manser | ................................. | 425/308 |

FOREIGN PATENT DOCUMENTS

| 58-162230 | 9/1983 | (JP) . |
| 59-34857 | 2/1984 | (JP) . |

\* cited by examiner

*Primary Examiner*—George C. Yeung
(74) *Attorney, Agent, or Firm*—Milde, Hoffberg & Macklin, LLP

(57) ABSTRACT

An apparatus and method for producing extruded elongate pasta of substantially even lengths. The apparatus includes: an extruder; a first cutter for cutting uneven tip portions of the bunches of elongate pasta; a second cutter for cutting the bunches of the elongate pasta, whose uneven tip portions have been cut, into an even length; and a sorting part for selectively sorting the bunches of elongate pasta having been cut into the even length with the second cutter from the uneven tip portions having been cut with the first cutter.

16 Claims, 17 Drawing Sheets

METHOD OF AND APPARATUS FOR PRODUCING EXTRUDED ELONGATE PASTA OF SUBSTANTIALLY EVEN LENGTHS

BACKGROUND OF THE INVENTION

1. Field of the Invention

The present invention relates to a method of and apparatus for producing extruded elongate pasta of substantially even lengths. More particularly, the present invention relates to an apparatus for producing pasta capable of cutting elongate pasta such as spaghetti extruded from an extruder into substantially even lengths, discretely dividing it into a specific quantity, and variously adjusting cutting length thereof.

2. Disclosure of the Related Art

There are two methods conventionally known to produce extruded elongate pasta products such as spaghetti. One of the methods includes the step of extruding pasta dough directly from a die to form elongate pasta. The other includes the steps of extruding pasta dough from a special die to form pasta sheets and then cutting the sheets into appropriate widths to form elongate pasta. More concretely, the latter method includes the steps of: extruding pasta dough by a linearly-perforated die to form pasta sheet; cutting the sheet with blades to form elongate pasta; and cutting elongate pasta into a predetermined length with a cutter. This method has an advantage of producing a predetermined quantity of pasta at a high speed, so that it is excellent in mass-producing the predetermined quantity of pasta. The methods making use of this advantage are disclosed in Japanese Laid-Open Patent Publication No. 58-162230 (1983) and the Japanese Laid-Open Patent Publication No. 59-34857 (1984).

In the above-cited methods, elongate pasta is produced by cutting pasta sheet with blades, and thus each elongate pasta is formed to have a rectangular section. Therefore, completely-circular-shaped elongate pasta can not be produced. Furthermore, the low extruding pressure to form pasta sheet may result in inferior quality and taste feeling of so produced pasta to that of elongate pasta produced by a direct extrusion method.

On the other hand, by using the method of producing elongate pasta by direct extrusion from a die (the direct extrusion method), high-quality dense pasta can be produced. Generally, in the direct extrusion method, elongate pasta is produced by the steps of; extruding pasta dough prepared by mixing a variety of materials from a die to form extruded elongate pasta each having a predetermined shape of cross-section; hanging the extruded elongate pasta from a pole; aligning the tips of the extruded elongate pasta by cutting them with a cutter; cutting the pasta strings into predetermined lengths and drying; and then weighing and packing the dried pasta products.

In this method, although the diameters of die holes of a single extruder are substantially constant, the extruding speed of elongate pasta from die holes varies. For example, as shown in FIG. 19(a), the substantial center portion of extruded elongate pasta 1 is extruded faster than the side portions in some cases, or as shown in FIG. 19(b), both side portions of extruded elongate pasta 1 are extruded faster in other cases. Extruding speed distribution of pasta varies depending upon performance characteristic of extruder and die, and characteristic of pasta dough. Therefore, speed distribution can not be held constant. For this reason, in the direct extrusion method, the lengths of extruded pasta are always uneven, so that the tips of pasta have to be cut to be aligned. Thus, it has been difficult to mass-produce elongate pasta by using this method.

Unlike the above-described method of producing dry pasta, in the case of producing fresh pasta and discretely dividing the pasta into a specific quantity for one meal, it is essential that equal quantities of pasta be distributed in the course of producing extruded elongate pasta. However, in the direct extrusion method, pasta dough cannot be extruded at a even speed from every die hole as mentioned above, so that the tips of pasta have to be cut to be aligned after extruded elongate pasta is divided into a specific quantity. Thus, it has been difficult to mass-produce a fresh elongate pasta divided in one meal.

Recently, there has been a great demand for extruded elongate pasta divided into a specific quantity produced by the direct extrusion method. However, there has been no practical method for mass-producing elongate pasta by the direct extrusion method and dividing it into predetermined quantities.

OBJECT AND SUMMARY OF THE INVENTION

As the result of our researches to overcome the above disadvantages, we have eventually achieved the present invention after we found that although extruding speed varies depending on the holes of a single die, the speed dispersion of extruding pasta can be limited within a predetermined range in a single die.

Accordingly, an object of the present invention is to provide an apparatus for producing extruded elongate pasta of substantially even lengths comprising:

an extruder for forming elongate pasta;

a first cutter for cutting tip portions of bunches of elongate pasta having been extruded from and dangling from said extruder;

a second cutter for cutting the bunches of the elongate pasta, whose tip portions have been cut, into an even length; and a sorting means for selectively sorting the bunches of elongate pasta having been cut into the even length with the second cutter from the tip portions having been cut with the first cutter, wherein the extruder, the second cutter, the first cutter and the sorting means are disposed in this order from a top to a bottom in substantially a vertical direction.

In the apparatus for producing extruded elongate pasta of substantially even lengths, pasta dough is pushed downward from the die of an extruder, thereby bunches of elongate pasta of uneven length are extruded and dangled from the extruder. Then uneven tips are cut off by the first cutter to make the lengths of extruded elongate pasta dangling from the extruder substantially even. It is noted that all the extruded elongate pasta of "substantially even lengths" herein should not be of precisely the same length. For example, in a case where quantitative irregularity is within an allowable range of a preset reference quantitative value, even when a part of elongate pasta or bunches is shorter than others, the elongate pasta or bunches as a whole is of "substantially even lengths" and the elongate pasta or bunches as a whole can be a commercial product. The term "even lengths" can be interchangeable with "substantially even lengths" herein. If necessary, however, all the extruded elongate pasta dangling from the extruder can be cut into precisely the same lengths. It is preferable that the first cutter is continuously operated until the uneven tip portions of the extruded elongate pasta are substantially completed to be cut, and then halted. Alternatively, the first cutter can be operated only when bunches of the extruded elongate pasta dangling from the extruder reach certain lengths to complete cutting uneven tip portions of elongate pasta at once. After uneven tip portions of elongate pasta are cut by the first cutter, the extruded elongate pasta dangling from the die is cut into substantially even lengths by the second cutter disposed underneath the die of the extruder. If the extruder is operated at a constant speed, the time required for producing extruded elongate pasta of substantially even lengths is constant. In other words, if the dispersion of the extruding speed is within a predetermined range, the cutting operation is repeated at a constant time-cycle, which makes it possible to mass-produce extruded elongate pasta of substantially even lengths.

A still further object of the present invention is to provide a method for producing extruded elongate pasta of substantially even lengths comprising the steps of:

cutting tip portions of bunches of elongate pasta having been successively extruded from and dangling from an extruder for forming elongate pasta; and cutting the bunches of elongate pasta, whose tip portions have been cut, in a predetermined position, wherein the steps are repeatedly executed, whereby bunches of elongate pasta of a substantially even length are produced.

By applying this method, extruded elongated pasta can be mass-produced.

BRIEF DESCRIPTION OF THE DRAWINGS

The preferred embodiments of the invention will be shown by way of drawings of the Figures, in which.

DESCRIPTION OF THE PREFERRED EMBODIMENTS

Figure 1:
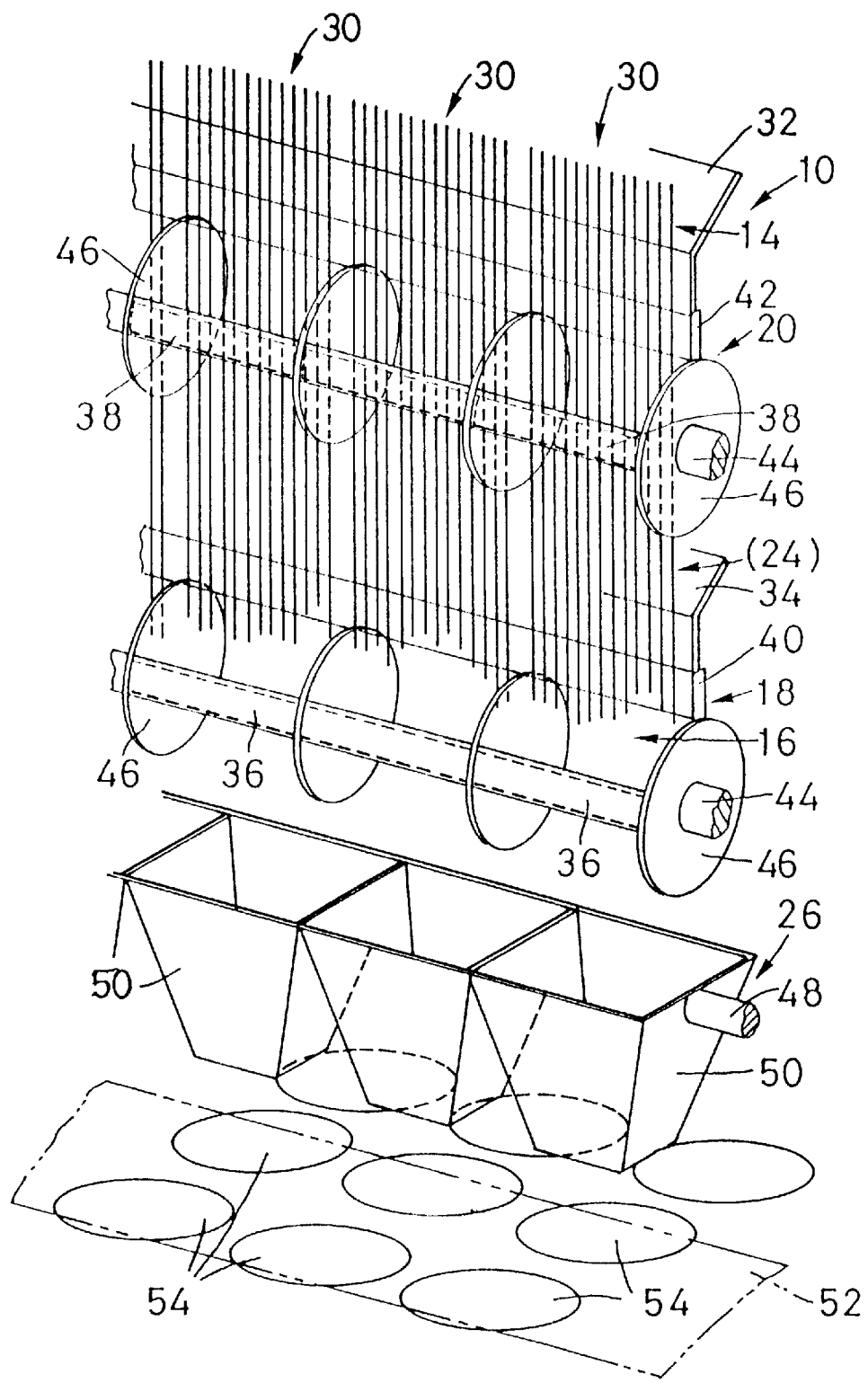
FIG. 1 is a perspective view of one embodiment of an apparatus for producing extruded elongate pasta products of substantially even lengths of the present invention.

An apparatus for producing extruded elongate pasta of substantially even lengths comprising:

an extruder for forming elongate pasta; a first cutter for cutting uneven tip portions of bunches of elongate pasta having been extruded from and dangling from said extruder; a second cutter for cutting the bunches of the elongate pasta, whose uneven tip portions have been cut, into an even length; and a sorting means for selectively sorting the bunches of elongate pasta having been cut into the even length with the second cutter from the uneven tip portions having been cut with the first cutter, wherein the extruder, the second cutter, the first cutter and said sorting means are disposed in this order from a top to a bottom in substantially a vertical direction.

In one aspect of the apparatus for producing extruded elongate pasta products of the present invention, the bunches of elongate pasta extruded from the extruder may be divided into groups each of a predetermined quantity, and the groups of the bunches of elongate pasta having been cut into the even length can be individually stored. Thus, a predetermined quantity of elongate pasta for one or several meal, or individual meal, can be obtained.

In another aspect of the apparatus for producing extruded elongate pasta products of the present invention, one or both of the first cutter and the second cutter employed in the above-mentioned apparatus may consist of a linear cutter blade rotated on a rotative body and a fixed blade to be geared with the linear cutter blade. The term "linear cutter blade" used herein includes a rectilinear cutter blade, a curvilinear cutter blade, and a winding cutter blade. The cutter blade gears with the fixed blade to cut elongate pasta every time when the linear blade makes a full turn on the rotative body such as a cylindrical surface.

Thus, elongate pasta can be cut off at a desired timing by rotating the linear cutter intermittently or rotating the linear cutter continuously by changing the rotation speed of the cutter.

Alternatively, one or both of the first cutter and the second cutter may consist of a linear cutter blade disposed swingably around an axis center and a fixed blade to be geared with the linear cutter blade. The cutter blade can gear with the fixed blade to cut elongate pasta every time when the cutter blade swings back and forth. Thus, bunches of elongate paste can be cut off at a desired timing by swinging the cutter blade properly in accordance with the extruding speed of the extruder.

In the apparatus for producing extruded elongate pasta of substantially even lengths wherein at least the first cutter consists of a linear cutter blade disposed swingably around an axis center and a fixed blade to be geared with the linear cutter blade, the sorting means may include a receiving member for supporting the cutter blade of the first cutter and for collecting the uneven tip portions having been cut with the first cutter, and the receiving member can be swing together with the cutter blade of the first cutter. In this embodiment, the sorting means and the linear cutter may be integrated into the first cutter, which makes it possible to collect the uneven tip portions having been cut with the first cutter by loading them on the receiving member supporting the linear blade.

Bunches of elongate pasta having been cut into the even length with the second cutter fall down through the different route, so that the bunches of elongate pasta of even lengths are never mixed with uneven tip portions having been cut with the first cutter.

In still another aspect of the present invention, the distance between the first cutter and the second cutter can be variously adjusted. By variously adjusting the distance between the two cutters, the lengths of elongate pasta produced by the apparatus of the present invention can be variously adjusted.

Alternatively, the sorting means may include a damper for selectively distributing the uneven tip portions having been cut with the first cutter to collecting means and the bunches of elongate pasta having been cut into the even length with the second cutter to storing means, and the damper is interlocked with the movement of the first cutter and the second cutter. By introducing the sorting means comprising the damper, uneven tip portions of elongate pasta having been cut with the first cutter are collected by the collecting means and the bunches of elongate pasta having been cut into even lengths with the second cutter are stored in the storage means.

The sorting means may include a substantially-horizontal pallet disposed below the first cutter, and the uneven tip portions having been cut with the first cutter are placed on the pallet and collected by the movement of the pallet in a substantially horizontal direction. Since the pallet may be positioned in a wide range below the first cutter in the substantially horizontal direction, uneven tip portions of elongate pasta having been cut off with the first cutter can be collected by the pallet without fail.

An apparatus for producing extruded elongate pasta of substantially even lengths may further comprise a scraping means for scraping out uneven tip portions placed on the pallet to be fed to the collecting means. Since uneven tip portions of elongate pasta cut with the first cutter mounted on the pallet can be scrap out from the pallet by this scraping mean, uneven tip portions of elongate pasta are delivered to the collecting means without adhering to the pallet.

A method for producing extruded elongate pasta of substantially even lengths comprising the steps of:
cutting uneven tip portions of bunches of elongate pasta having been successively extruded from and dangling from an extruder for forming elongate pasta; and
cutting the bunches of elongate pasta, whose uneven tip portions have been cut, in a predetermined position,
wherein the steps are repeatedly executed, whereby bunches of elongate pasta of a substantially even length are produced.

By this method, elongate pasta can be mass-produced.

In the method, the bunches of elongate pasta successively extruded from and dangling from said extruder can be divided into groups each of a predetermined quantity, and the groups of the bunches of elongate pasta having been cut into the substantially even length can be individually stored, thus constant quantity of elongate pasta for individual meal can be obtained.

In a method for producing extruded elongate pasta employed in the apparatus for producing extruded elongate pasta of substantially even lengths, the first cutter can be continuously operated so as to constantly cut the uneven tip portions of the bunches of elongate pasta and can be intermittently halted at a predetermined interval during which the uneven tip portions are substantially completed to be cut, and the second cutter can be operated while the first cutter is being halted, so as to cut the bunches of elongate pasta, whose uneven tip portions have been cut, in a predetermined position, whereby the bunches of elongate pasta of a substantially even length can be produced. By way of introducing the above-referred method, elongate pasta can be mass produced at a fast processing rate.

The detailed preferred embodiments of the present invention will now be described with respect to the drawings. Like features of the drawings are indicated with the same reference numerals.

Figure 2:
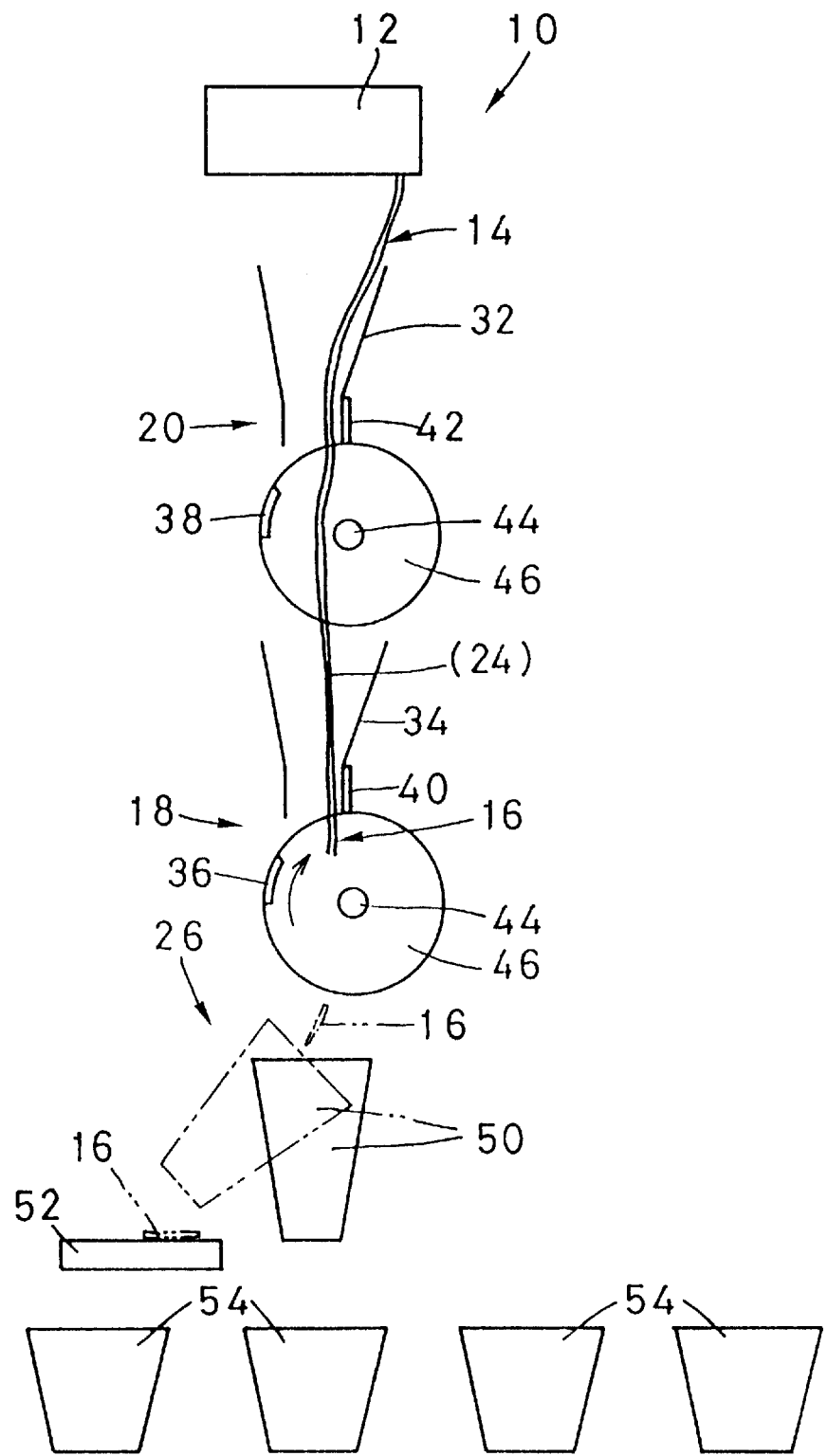
FIG. 2 is a side view of the apparatus of FIG. 1 showing how the apparatus works partly.

As shown in FIG. 1 and FIG. 2, the apparatus 10 for producing extruded elongate pasta products of substantially even lengths comprises: an extruder 12; a first cutter 18 for cutting uneven tip portions 16 of bunches of elongate pasta having been extruded from and dangling from the extruder 12; a second cutter 20 for cutting elongate pasta 14 whose uneven tip portions have been cut into even lengths; and a sorting means (sorting part) 26 for selectively sorting out uneven tip portions 16 cut with the first cutter 18 from elongate pasta 24 having been cut into the even lengths with the second cutter 20. The extruder 12, the second cutter 20, the first cutter 18, and the sorting part 26 are disposed in the substantially vertical direction from top to bottom in this order.

As an extruder 12, a screw extruder capable of extruding pasta dough prepared in advance from a die with a number of holes can be used. However, the structure of the extruder is not particularly limited. An extruder 12 capable of continuously extruding the elongate pasta 14 is preferably used to mass-produce bunches of elongate pasta. A die secured to the extruder is provided with a number of holes arranged in zigzag or grid form. As shown in FIG. 1, the die may be provided with sections 30, each of which consists of a predetermined number of holes to obtain appropriate units or groups of a predetermined quantity of elongate pasta 14. Therefore, the section 30 consisting of the predetermined quantity of the elongate pasta 14 is led into an individual chute 32. The holes of a single die have a constant diameter which corresponds to the diameter of elongate pasta produced. The number of elongate pasta extruded from die holes can be adjusted by plugging some of the holes of a die, if necessary.

The elongate pasta 14 extruded from and dangling from each section of the extruder 12 are guided along the inner surface of the side wall of the chute 32, passed through the second cutter part 20, guided along the inner surface of the side wall of another chute 34, and then passed though the first cutter 18. The first cutter 18 is composed of a linear blades 36 and a fixed blade 40, and the second cutter 20 is composed of a linear blade 38 and a fixed blade 42, respectively. The linear blades 36 and 38 rotate respectively on the different axes 44 supported respectively by the different frames (not shown) by a driving device having a motor (not shown). The cutter blades 36 and 38 can be respectively formed as a part of rotative body surface such as a cylinder surface. For example, the cutter blades 36 and 38 are respectively secured to the external peripheral portion of rotative discusses 46 and 46 functioning as partition boards, thus the blades are rotated in the periphery of the corresponding shaft 44 at a predetermined timing via a driving device (not shown). The fixed blades 40 and 42 are respectively disposed at the side bottom part of the chutes 32 and 34 and secured to the discretely provided frames axially holding the shafts 44/44 provided for the cutter blades 36 and 38.

Figure 3A:
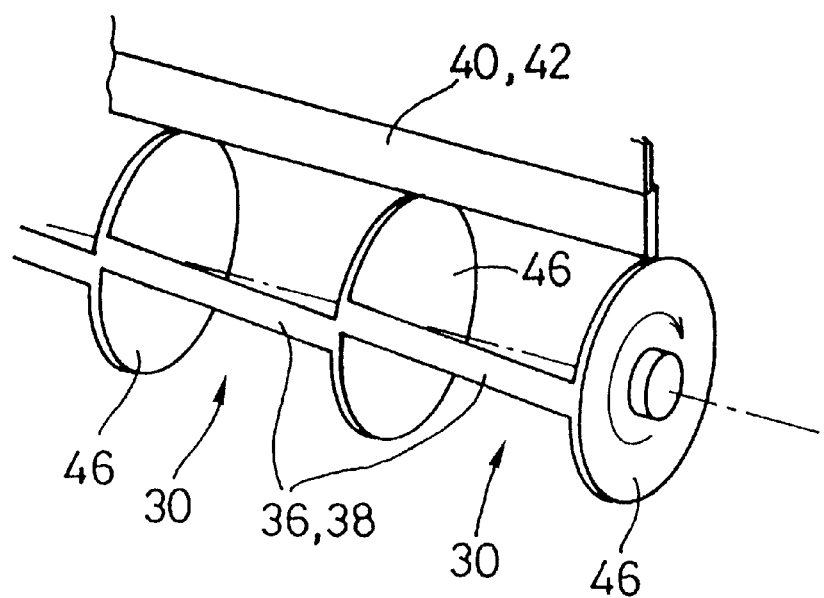
FIGS. 3(a) and (b) are perspective views showing other embodiments of first cutters or second cutters employed in the apparatus for producing extruded elongate pasta products of substantially even lengths of the present invention.
Figure 3B:
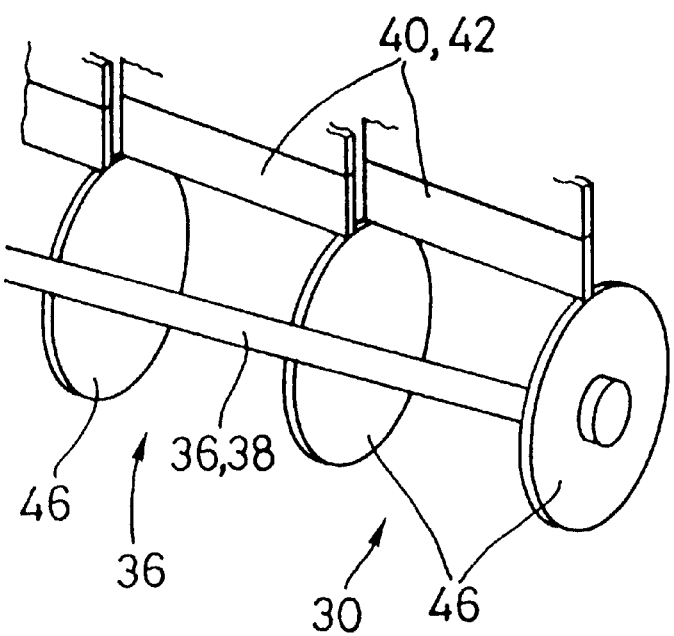

The cutter blades 36 and 38 and the fixed blades 40 and 42 may respectively be disposed in a substantially straight line. Alternatively, as shown in FIG. 3(*a*), the positions at which the cutter blades 36/38 and the fixed blades 40/42 are geared may gradually be shifted by obliquely setting the cutter blades 36/38 per section 30 separated by the rotary discuss 46. In another embodiment, such a structure may also be introduced, in which the positions at which the cutter blades 36/38 and the fixed blades 40/42 are engaged may gradually be shifted by obliquely setting the fixed blades 40/42 per section 30 separated by the rotary discuss 46. It is also possible to obliquely set both of the cutter blades 36/38 and the fixed blades 40/42. Further, in the above-mentioned embodiment of the present invention, either or both of the cutter blades 36/38 and the fixed blades 40/42 may also be formed in a curved line or in a line traced on the surface of a cylinder, i.e., winding line. Not only the above-referred embodiments, but any form of the blades may also be introduced without restriction. By way of obliquely setting the cutter blades 36/38 or the fixed blades 40/42 or by way of forming them in a curved line, the sectional surface of elongate pasta becomes neat, and yet, since bunches of elongate pasta 14 is cut in sequence, the load put on the blades is reduced, and thus facilitate cutting operation.

The distance between the frame secured with the first cutter 18 and the frame secured with the second cutter 20 may be held constant or adjustable. When the rotating cutter blades 36/38 are engaged with the corresponding fixed blades 40 and 42, the first cutter 18 and the second cutter 20 respectively cut bunches of elongate pasta being present threat.

Figure 4:
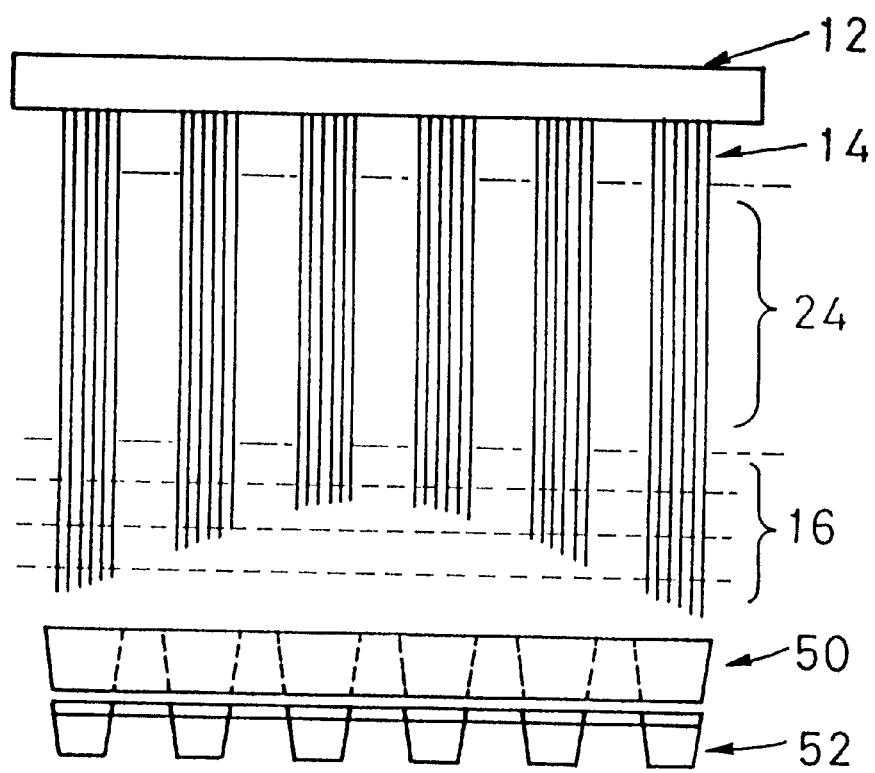
FIG. 4 is a front view which mainly shows elongate pasta having been extruded from and dangling from an extruder in the apparatus depicted in FIG. 1.

Of those cutters cited above, the cutter blade 36 of the first cutter 18 may be rotated at a constant speed. As shown in FIG. 4, the cutter blade 36 finely cuts the tip-end of elongate pasta having been extruded from and dangling from the extruder 12, whose end led outward below the fixed blade 40 in sequence to cut off uneven tip portions 16 of the elongate pasta. When uneven tip portions 16 of bunches of the elongate pasta 14 are as a whole linearly cut, rotation of the cutter blade 36 is halted. The bunches of elongate pasta 14 may include shorter elongate pasta than other aligned bunches of pasta. The length of bunches of elongate pasta dangling from the extruder should not necessarily be precisely even. Operation of the cutter blade 36 can be intermittently halted at a predetermined interval. The interval may be determined via a timer's program set by the previous computation of time needed to obtain a predetermined quantity of elongate pasta, whose uneven tip portions are completed to be cut, dangling from the extruder per each section 30 separated by the rotary discuss 46. The cutter blade 36 brought to a halt is re-operated after detecting that the second cutter 20 has been operated. The cutter blade 38 of the second cutter 20 may remain halted at a constant position, most of the time. When the cutter blade 36 of the first cutter 18 is halted, the cutter blade 38 is rotated to be geared with the fixed blade 42, and then, after cutting the bunches of elongate pasta 14 to make the elongate pasta 24 of substantially even lengths, the cutter blade 38 is rotated up to a predetermined position at such a speed that the blade does not come into contact with the elongate pasta 24, and then the cutter blade 38 comes to a stop.

A sorting part 26 is disposed below the first cutter 18, which selectively sorts the bunches of elongate pasta 24 having been cut into the even length with the second cutter 20 from the uneven tip portions 16 having been cut with the first cutter 18. The sorting part 26 may consist of a sorting damper 50 which is swingably moved around a shaft 48 by a cylinder. The damper 50 distributes the uneven tip portions having been cut to the collecting conveyer 52, which in turn delivers the uneven tip portions 16 out of the apparatus, and the bunches of elongate pasta having been cut into the even length to a storing basket 54.

Figure 5:
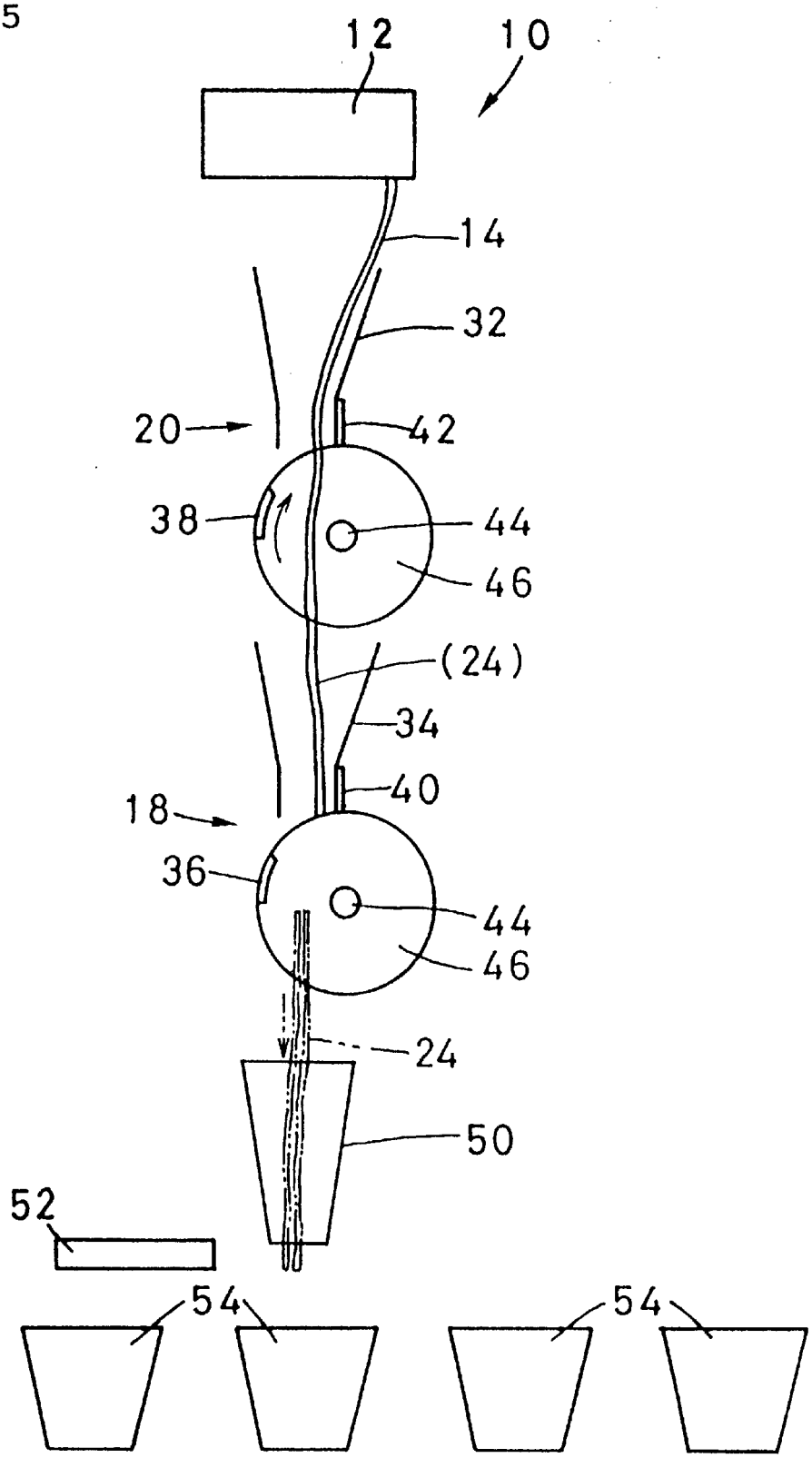
FIG. 5 is a side view of the apparatus of FIG. 1 showing how the apparatus works partly.

While the first cutter 18 is operated, the sorting damper 50 is rotatably shifted to the position shown in a two-dot chain line in FIG. 2, whereby the sorting damper 50 periodically distribute the bunches of uneven tip portions 16 onto the collecting conveyer 52. The uneven tip portions 16 mounted on the collecting conveyer 52 are collected into the extruder 12 and then mixed together for recycling. Next, immediately after the uneven tip portions 16 are passed through sorting damper 50 while the operation of the first cutter 18 being halted, the sorting damper 50 is led to the original position shown in solid line in FIG. 2. Simultaneously, as shown in FIG. 5, the cutter blade 38 of the second cutter 20 is rotatably driven to cut the constant amount of bunches of elongate pasta into even length to have a constant amount of bunches of pasta 24, which in turn fall themselves. The elongate pasta 24 cut into the even lengths are respectively positioned when passing through the sorting damper 50, to be securely stored in the basket 54. The basket 54 storing the elongate pasta 24 are then transferred to be subjected to the following process, whereas an empty basket 54 is positioned below the sorting damper 50. The basket 54 is continuously or intermittently transferred. In any case, the basket 54 is transferred based on such a timing correctly interlocking the operation of the first cutter 18 and the second cutter 20 respectively being operated in accordance with a specific time cycle.

Structure of the apparatus 10 for producing extruded elongate pasta products of substantially even lengths of the present invention has been described in conjunction with operations thereof. The apparatus 10 of the present invention can be repeatedly operated to mass produce extruded elongate pasta divided into individual meals.

Figure 6:
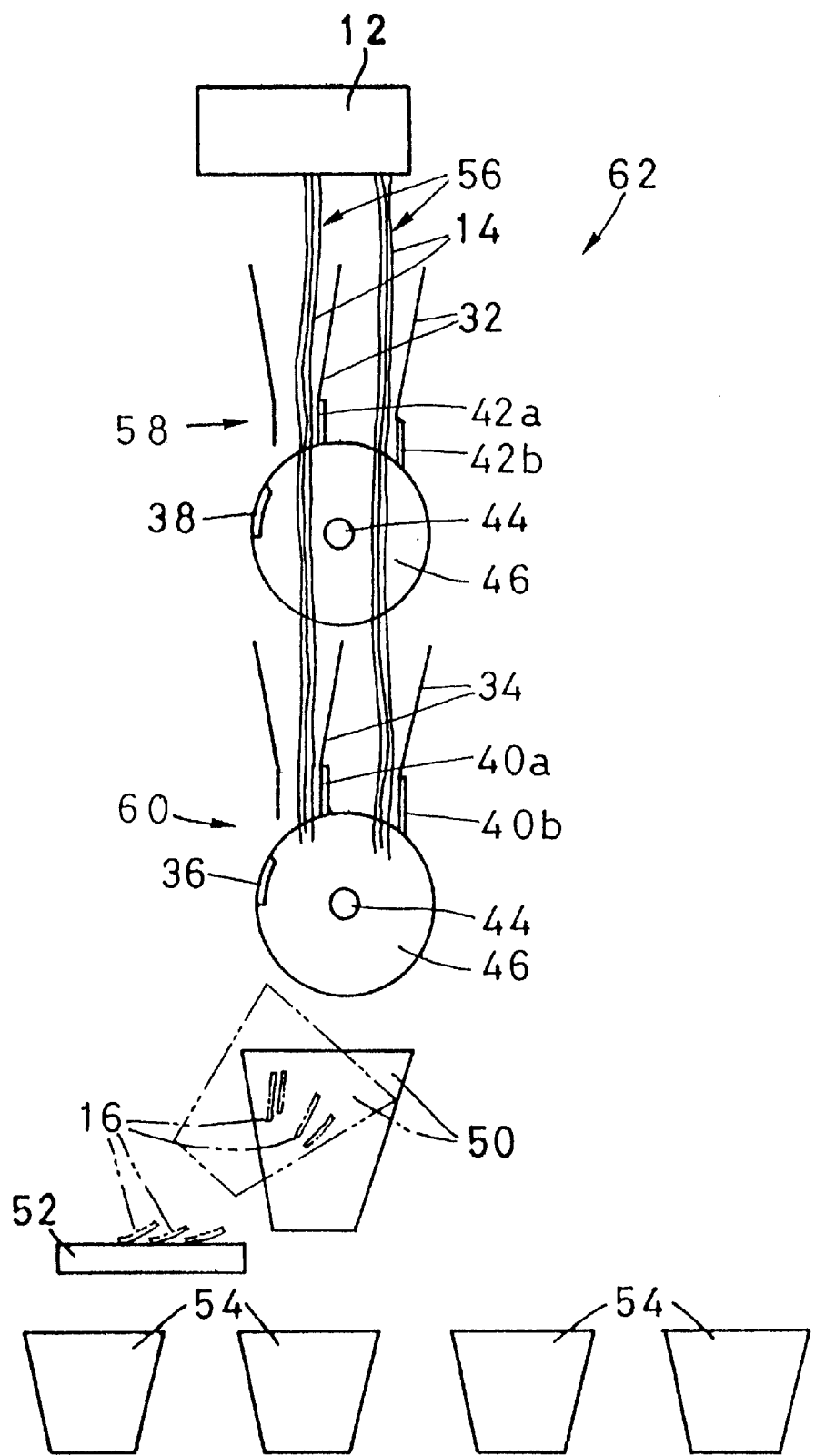
FIG. 6 is a side view of another embodiment of an apparatus for producing extruded elongate pasta products of substantially even lengths of the present invention, showing how the apparatus works.
Figure 7:
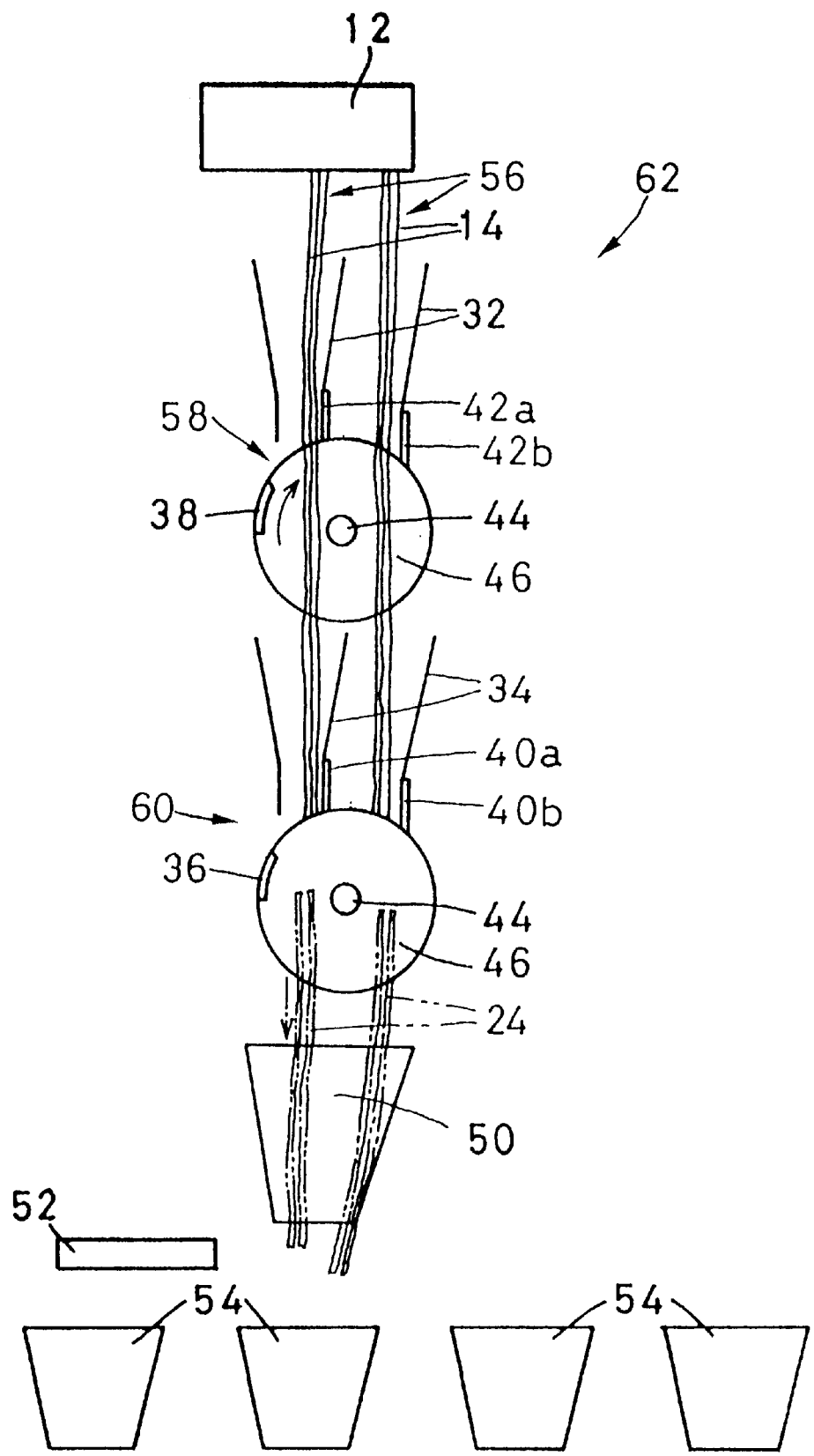
FIG. 7 is a side view of the apparatus of FIG. 6 showing how the apparatus works.

It should be understood that the apparatus of the present invention is not solely limited to the above-described embodiment, but the invention can be embodied via a variety of forms. For example, as shown in FIG. 6, if a large quantity of elongate pasta 14 were included in an individual meal, it is possible to provide a section of an apparatus 10 with a pair of subsections 56. Concretely, as shown in FIG. 6, holes of a die provided for one section of the extruder 12 are divided into a pair of subsections 56, and then the bunches of elongate pasta 14/14 extruded from a pair of subsections 56 are respectively guided into individual chutes 32 and further to a second cutter 58. Further, the bunches of elongate pasta 14 in each subsection 56 are guided into the individual chutes 34 and further to a first cutter 60. The first cutter 60 is composed of a pair of fixed blades 40a/40b and a rotary cutter 36. The second cutter 58 is composed of a pair of fixed blades 42a/42b and a rotary cutter blade 38. The structures of other components of the embodiment shown in FIG. 6 are identical to those of the previously-described embodiment, and thus, further description thereof is omitted.

In the apparatus 62 for producing extruded elongate pasta products of substantially even lengths shown in FIG. 6, uneven tip portions 16 of extruded bunches of elongate pasta are finely cut off by the first cutter 60, and then led into a collecting conveyer 52 via a sorting damper 50 for recycling. Every time the rotary cutter blade 36 makes a full turn, a pair of fixed blades 40a and 40b individually and simultaneously cut off the uneven tip portions 16 of the bunches of elongate pasta 14/14, and then the uneven tip portions 16 having been cut are collected into a storage zone via the sorting damper 50. Thus, after the tip of bunches of elongate pasta 14 in a pair of subsections 56 to be properly aligned by the first cutter 60, the bunches of elongate pasta 14 per subsection 56 are cut off by the second cutter 58 to complete production of the bunches of elongate pasta 24 having substantially even lengths. Bunches of elongate pasta 24/24 produced in a pair of subsections 56 are then integrally combined with each other on the way of falling into the sorting damper 50 before eventually being accommodated in a basket 54 to make an individual meal. According to the apparatus 62, the elongate pasta 14 having been extruded and dangling from a die per one section are further divided into a pair of subsections 56 to cut the elongate pasta 14/14 to be cut off discretely per subsection. Therefore, there are no possibility that the elongate pasta 14/14 is crushed at cut-off portions to generate deformation nor adhered to each other. The small quantity of extruded elongate pasta per an individual meal one section can be cut at once as shown in the previously-described apparatus 10. However, if there were a large quantity of extruded elongate pasta per individual meal, it is desired that the bunches of elongate pasta 14 for individual meal are cut off by way of dividing them into plural subsections. The subsection 56 is not solely limited to a pair, but 3 or more of subsections may also be effected without restriction in particular.

Although the distance between the both first cutters 18/60 and the second cutters 20/58 can be set constant, it is preferred that the distance between both cutters can optionally be changed as required. By properly adjusting the distance between the first cutters 18/60 and the second cutters 20/58, the length of the produced bunches of pasta 24 can be changed to optimize the weight of elongate pasta per individual meal. Since the weight of elongate pasta per individual meal is determined by the number and length of bunches of elongate pasta, the weight is finely adjusted by way of finely adjusting the length of bunches of pasta 24, i.e., the distance between the first cutters 18/60 and the second cutters 20/58 or by adjusting the number of bunches of pasta by way of plugging through-holes of the die or conversely by opening plugged holes.

Figure 8:
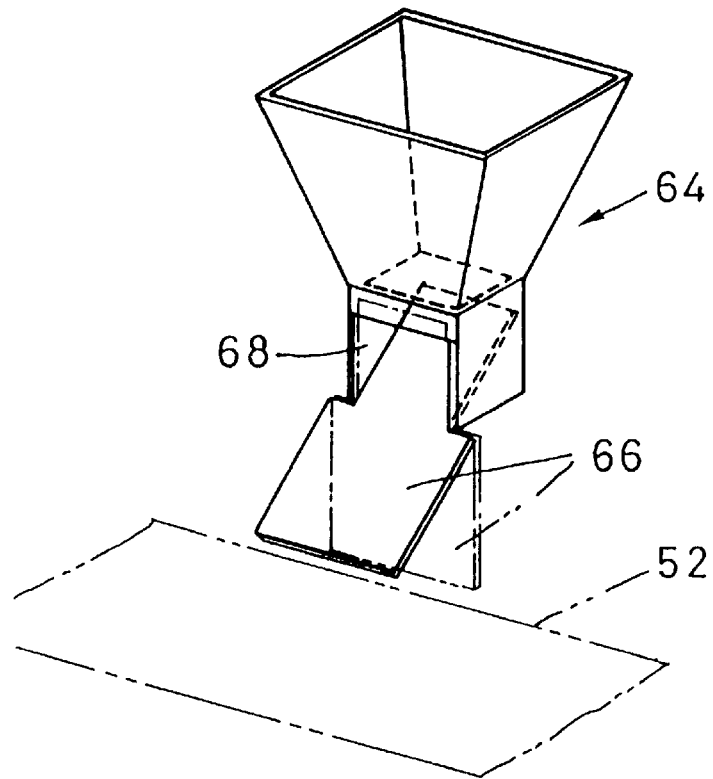
FIG. 8 is a perspective view of one embodiment of a sorting part employed in the apparatus of the present invention.

Further, sorting damper 50 for making up the sorting mean swingably moving in the previous embodiment can be changed to other embodiments. As shown in FIG. 8 for example, a stationary damper 64 may be introduced in which a switchover plate 66 to shift passage of the damper 64 is provided. In this case, the switchover plate 66 can be axially rotated via a driving device (not shown) such as a cylinder, an electromagnetic solenoid, or a motor, for example.

While the first cutters 18/60 are respectively operated, the switchover plate 66 closes the path inside of the stationary damper 64 and opens an aperture 68 formed through the lateral wall as shown in FIG. 8 via a solid line. On the other hand, while the second cutters 20/58 are respectively operated, the switchover plate 66 opens the path inside of the damper 64 and closes the aperture 68 as shown in FIG. 8 via a two-dot chain line. Accordingly, while the first cutters 18/60 are cutting off uneven tip portions 16 of bunches of elongate pasta 14, the path inside of the damper 64 is closed by the switchover plate 66. Thus, after coming into contact with the surface of the switchover plate 66, the uneven tip portions 16 are ejected through the aperture 68. The ejected tip portions 16 is then collected by the collecting conveyer 52 for recycling. When bunches of elongate pasta are cut into a substantially even length by the second cutters 20/58 to produce elongate pasta 24 of even lengths, the switchover plate 66is rotated to clog the aperture 68 to cause passage of the stationary damper 64 to allow the constant amount of bunches of pasta 24 to pass through the damper 64, which is, in turn, stored in the basket 54.

Figure 9:
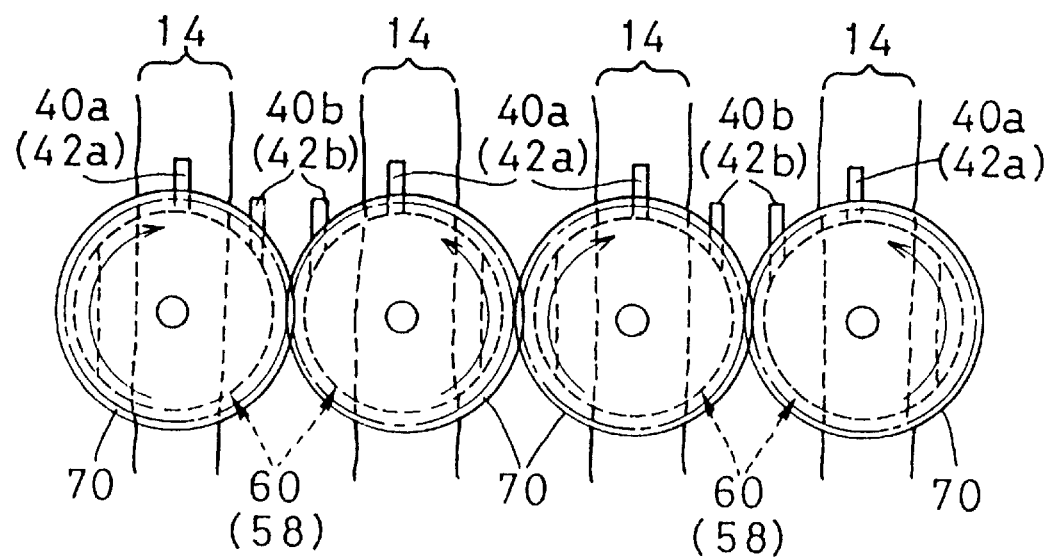
FIG. 9 is a side view showing other embodiments of first cutters or second cutters employed in the apparatus of the present invention.

According to the above-referred embodiments, a process of simultaneously producing a plurality of individual meals by way of splitting single-file-directional bunches of elongate pasta 14 into plural sections has been exemplified. Further, as shown in FIG. 9, it is also possible to extrude plural files of bunches of elongate pasta 14 from an extruder and cut them with the first cutters 60 and the second cutters 58 each corresponding to a respective file of bunches of elongate pasta 14. Introduction of this production system facilitates mass production of a large number of individual meals all at once.

As shown in FIG. 9, the first cutters 60 or the second cutters 58 are engaged via gears 70. Simultaneous with transmission of rotating force to one of the gears 70, all the gears 70, in other words, all the first cutters 60 or the second cutters 58 are rotated. However, the rotational direction is inverse from each other, and thus, fixed blades 40a/40b or fixed blades 42a/42b are disposed at positions inverse from each other. By introducing the above structure, the apparatus for producing extruded elongate pasta products of the present invention can be down-sized.

Figure 10:
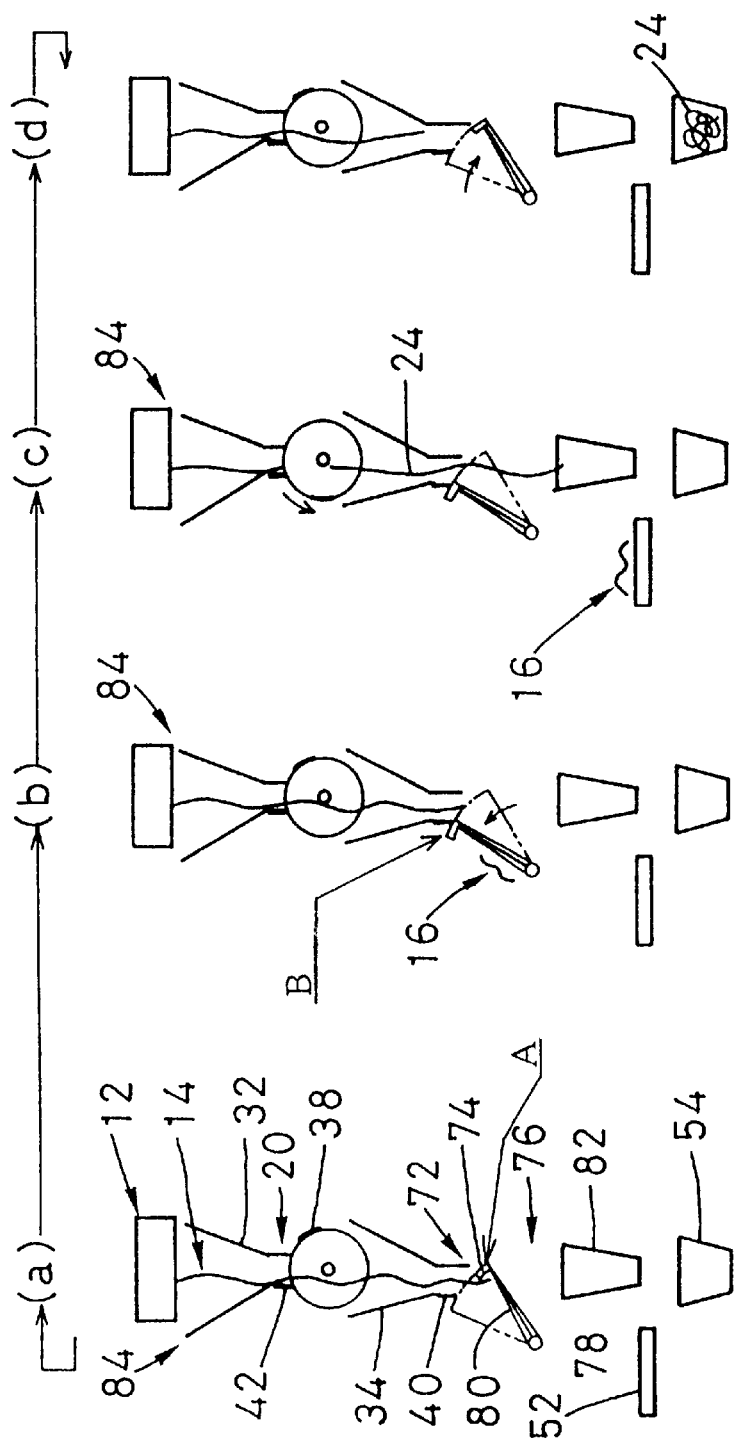
FIGS. 10(a) to (d) are side views showing other embodiments of apparatus for producing extruded elongate pasta of substantially even lengths and methods for the producing the same of the present invention.

Next, as shown in FIG. 10(a), it is possible to integrally combine a cutter blade 74 of a first cutter 72 with a sorting zone or sorting member 76 thereby simultaneously swing the cutter blade 74 and the sorting zone 76 by way of intermittently or continuously moving them around a shaft 78. More particularly, a linearly formed fixed blade 40 of the first cutter 72 is disposed at the bottom portion of a chute 34. The cutter blade 74 which can be engaged with the fixed blade 40 is also linearly formed and disposed at the end portion of the sorting zone 76. Although it is desired that the cutter blade 74 be obliquely disposed relative to the fixed blade 40, there is no restriction in particular. The sorting zone 76 comprises a plane-shaped receiving plate 80, a shaft 78 functioning as the pivot of swing of the receiving plate 80, and a driving device (not shown) for generating swing of the receiving plate 80. A stationary damper 82 can be disposed below the fixed blade 40 as required. The cutter blade 74 is disposed at the end portion being opposite from the end at which the shaft 78 of the receiving plate 80 is provided. Description of those components identical to those shown in the preceding embodiments is omitted by way of indicating similar features of the drawings with the same reference numerals. In the same way as is done for the preceding embodiments, pasta dough is continuously extruded to form elongate pasta 14 dangling from the extruder in the vertical direction as affected by its own weight in the apparatus 84. Bunches of elongate pasta 14 are then led to a chute 32 and pass themselves between a cutter blade 38 and fixed blade 42 of a second cutter 20 and then led to another chute 34, and finally enter themselves between the cutter blade 74 and a fixed blade 40 of the first cutter 72. In this embodiment, the cutter blade 74 of the first cutter 72 and the receiving plate 80 may be held still in a fully open condition, in other words, at positions fully covering the outlet of the chute 34 by a driving device not shown. Alternatively, the cutter blade 74 and the receiving plate 80 may swing at a specific period.

In an embodiment where the cutter blade 74 is held still and moved, after uneven tip portions 16 of extruded bunches of elongate pasta 14 are fully protruded themselves from the position of the fixed blade 40 thereby enabling access to bunches of elongate pasta each having a substantially even length, the cutter blade 74 thus far held in the still mode and the receiving plate 80 are simultaneously moved to cut off the tip-portions 16 of bunches of elongate pasta 14 as shown in FIG. 10(b). Then after completing the cutting operation, the cutter blade 74 is brought to a halt at the position of the fixed blade 40. Alternatively, in an embodiment where the cutter blade 74 continuously swings itself, the uneven tip portions 16 of the bunches of elongate pasta 14 are cut off bit by bit from the tip-end downwardly protruded from the position of the fixed blade 40. After properly aligning the tip of bunches of pasta 14, the cutter blade 74 is brought to a halt at the position of the fixed blade 40. In any case, the uneven tip portions 16 are received by the receiving plate 80 and then fall onto a surface of the collecting conveyer 52 to be collected for recycling.

During the cutter blade 74 is halted at the position of the fixed blade 40, the cutter blade 38 of the second cutter 20 is driven to cut off the bunches of elongate pasta 14 as shown in FIG. 10(c).

Since the tip of the cut-off bunches of elongate pasta 24 are properly aligned by the first cutter 72, the cut-off bunches of pasta 24 are formed into a substantially even length. Then, the bunches of pasta 24 each having a substantially even length are led to a damper 82 and then stored in a basket 54 as shown in FIG. 10(d). The cutter blade 38 of the second cutter 20 is rotated to make a full turn and brought back to the original position. The cutter blade 74 and the receiving plate 80 of the first cutter 72 are brought back to the original position, where they are subject to a halt or swinging. Then, they are subject to repeated operations identical to that performed in the above embodiment.

Even in the apparatus 84 having the above structure, it is possible to properly vary the distance between the first cutter 72 and the second cutter 20, thus facilitating production of bunches of elongate pasta 24 having desired lengths.

The above-referred apparatus 84 achieves a satisfactory effect identical to that is achieved by the apparatus of the same kind described for the preceding embodiments. Further, since the above apparatus 84 totally separates a path for the uneven tip portions 16 from the other path for the bunches of elongate pasta 24 each having a even length, the uneven tip portions 16 are not mixed into the basket 54.

Figure 11:
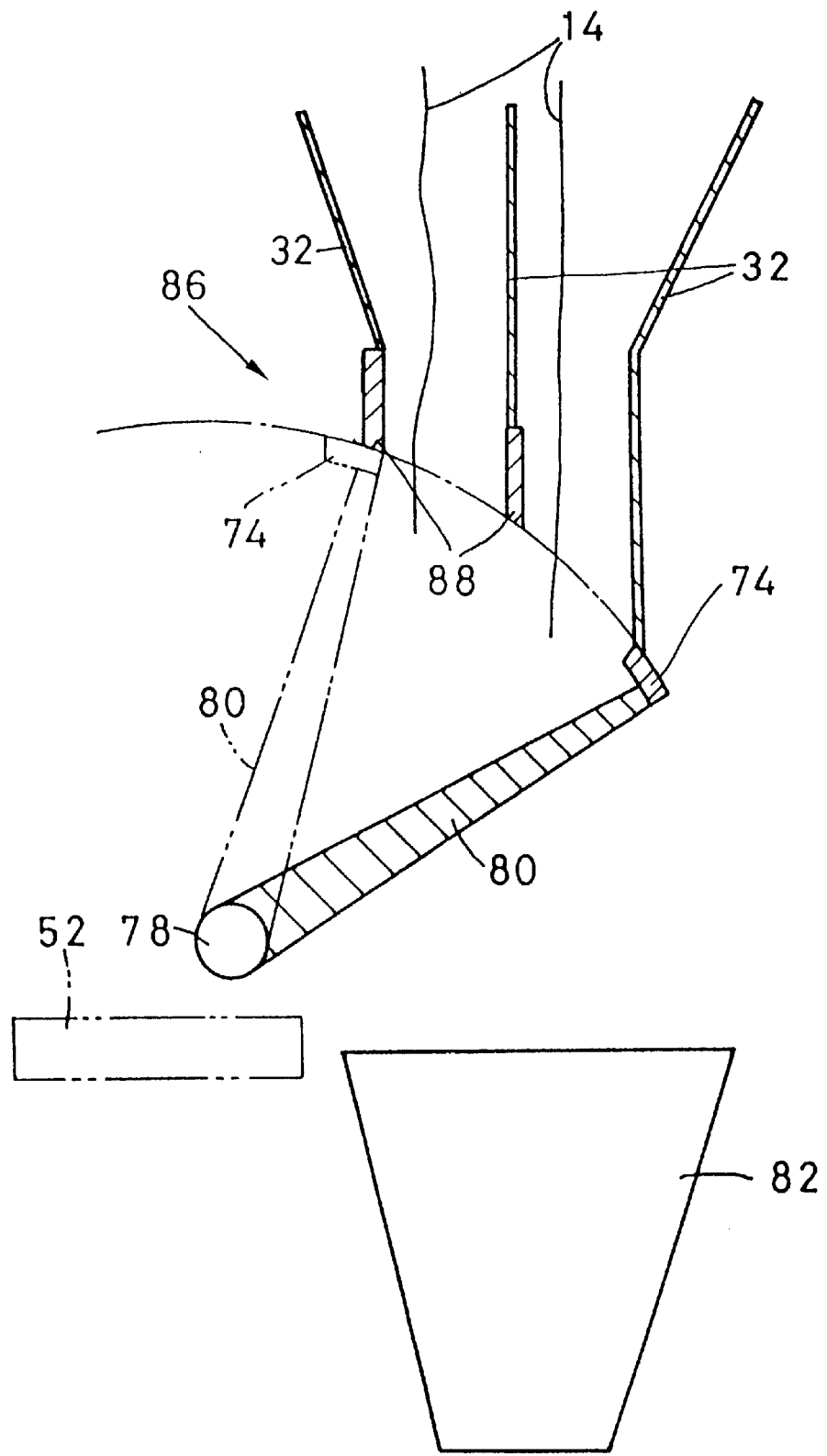
FIG. 11 is a side view showing another embodiment of a first cutter employed in the apparatus of the present invention.

Further, if it is difficult to cut off the whole bunch of elongate pasta 14 per individual meal via a single cutting operation due to a great quantity of elongate pasta included in the whole bunch, it is also possible to divide a section into a pair of subsections and provide a pair of fixed blades 88 of the first cutter 86 as shown in FIG. 11 in the above-mentioned apparatus 84. In this embodiment, the whole bunch of elongate pasta 14 divided into subsections may respectively be cut by the cutter blade 74 and each of the fixed blades 88 without fear of causing the sectioned portions of bunches of pasta 14 to be crushed nor causing individual elongate pasta pieces to adhere to each other.

Figure 12:
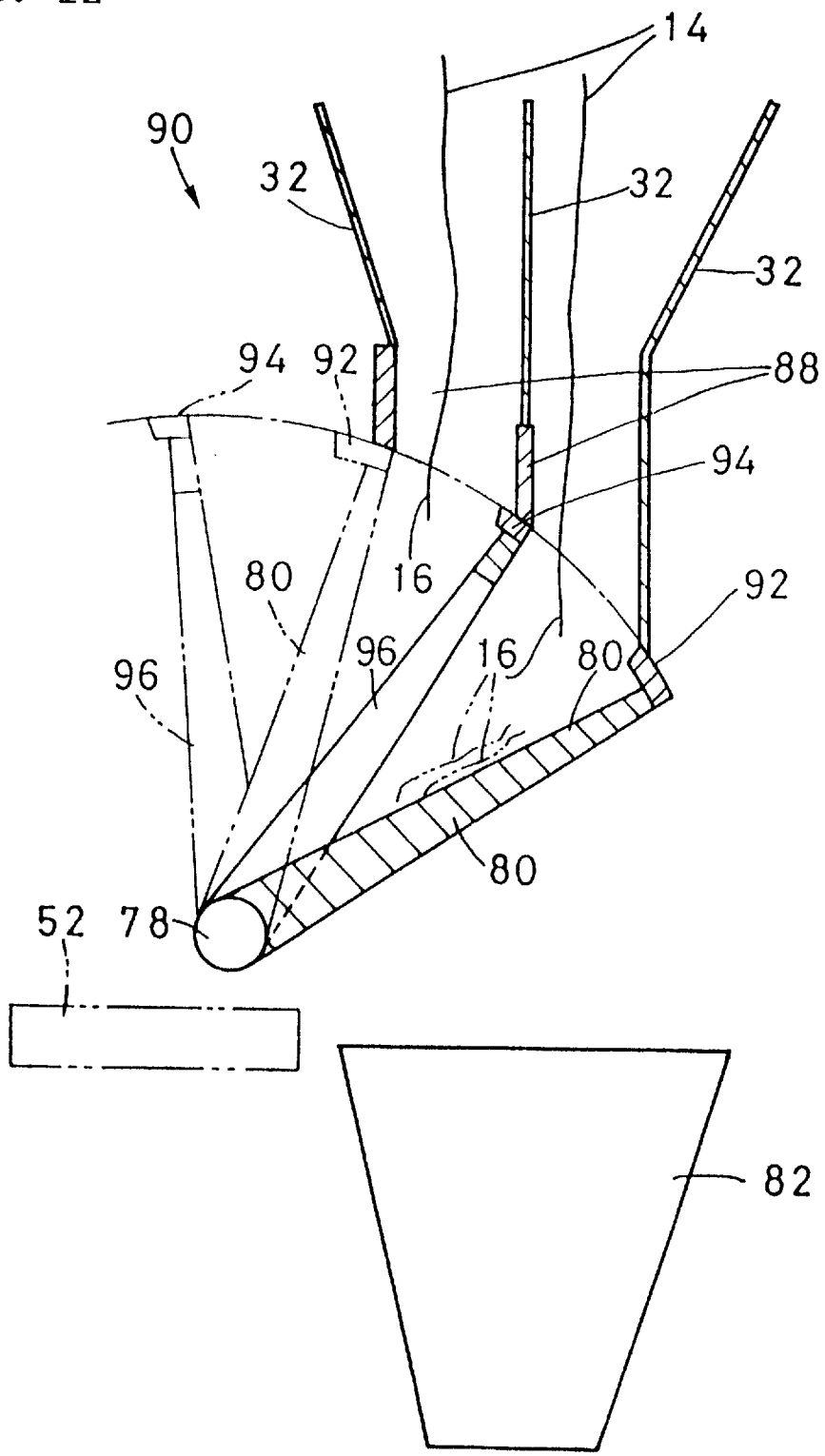
FIG. 12 is a side view showing another embodiment of a first cutter employed in the apparatus of the present invention.

As shown in FIG. 12, it is also possible to provide a pair of fixed blades 88 and a pair of cutter blades 92 and 94 each corresponding to a pair of fixed blades 88/88 for the first cutter 90. In this embodiment, a receiving plate 80 is secured to the cutter blade 92 being in the outermost position against the cutting direction, whereas a frame 96 for supporting a linearly formed cutter blade 94 is secured to the internally-positioned cutter blade 94 to enable the receiving plate 80 to receive the uneven tip portions 16 cut off by the cutter blade 94.

Accordingly, the uneven tip portions 16 cut off by either of the cutter blades 92 and 94 are both received by the receiving plate 80 and then sliding down to a collecting conveyer for recycling.

In the above-identified embodiments, after cutting the uneven tip portion 16 of the bunches of elongate pasta 14, the cutter blades 74, 92, and 94, are respectively brought to a stop at a position where they do not clog aperture at the bottom of the chute 32 as shown via two-dot chain line in FIG. 12.

Figure 13:
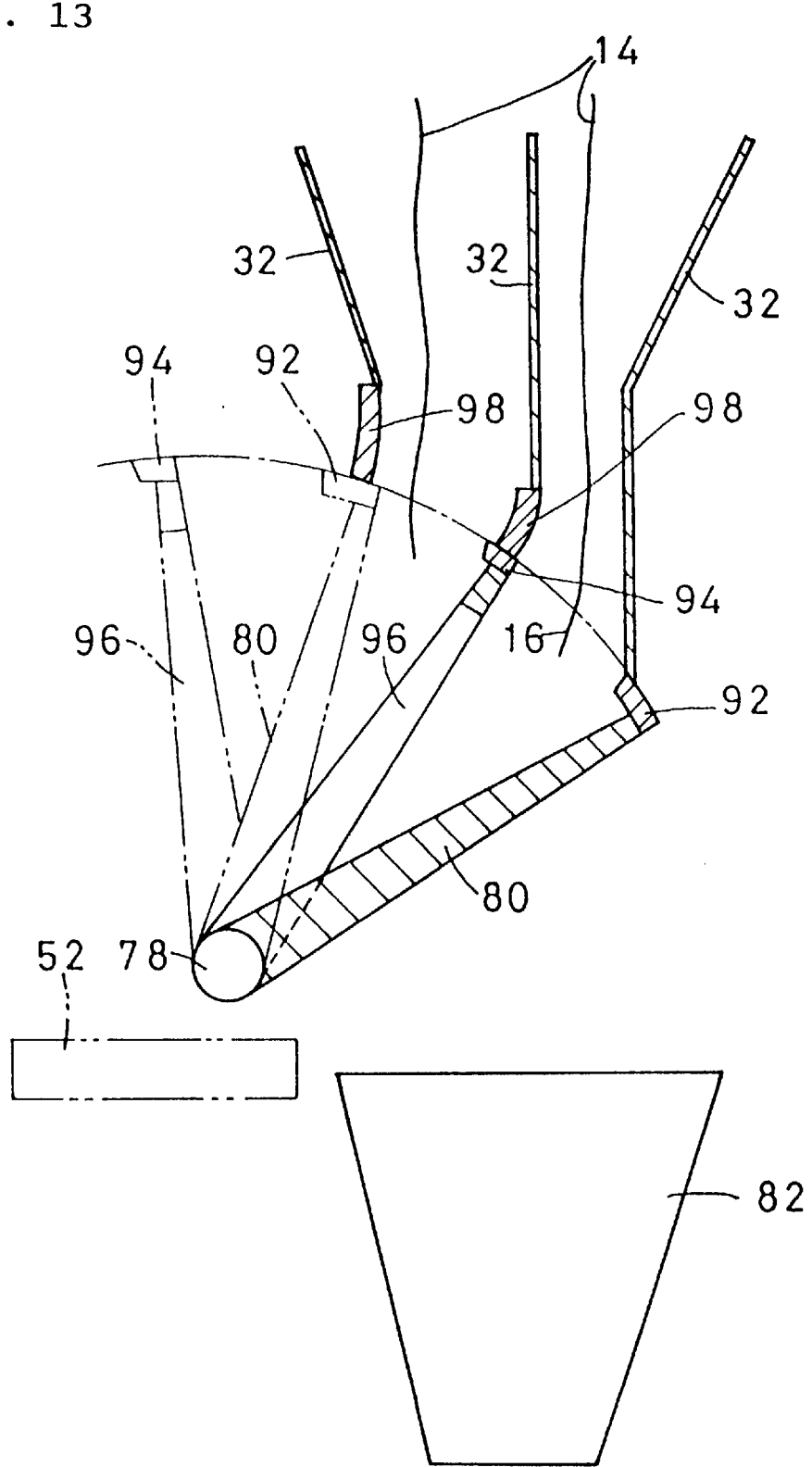
FIG. 13 is a side view showing yet another embodiment of a first cutter employed in the apparatus of the present invention.

Further, in the above-referred embodiments, there may be such a case where the fixed blades 40/42 and the cutter blades 38/74 may not respectively be disposed in the radial direction, thereby cutting the bunches of elongate pasta 14 obliquely. In this case, as shown in FIG. 13, the fixed blade 98 can be formed in a curved line so that, when the fixed blade 98 is engaged with the cutter blades 92 and 94, the bunches of pasta 14 can be along the surface-form of the fixed blade 98, thus making it possible to generate a substantially orthogonal cutting angle. In this way, bunches of pasta 14 can be cut off substantially orthogonally.

The structure of a cutter is not solely limited to the above-described forms of embodiment. As shown in FIG. 14 for example, the cutter 100 cited for this embodiment is structured by way of the following steps: Initially, a through-hole 102 is formed through a plane plate. Next, an end portion is formed into a fixed blade 104. Finally, a sliding blade 106 capable of sliding itself along the fixed blade 104 is disposed below the fixed blade 104.

Figure 14A:
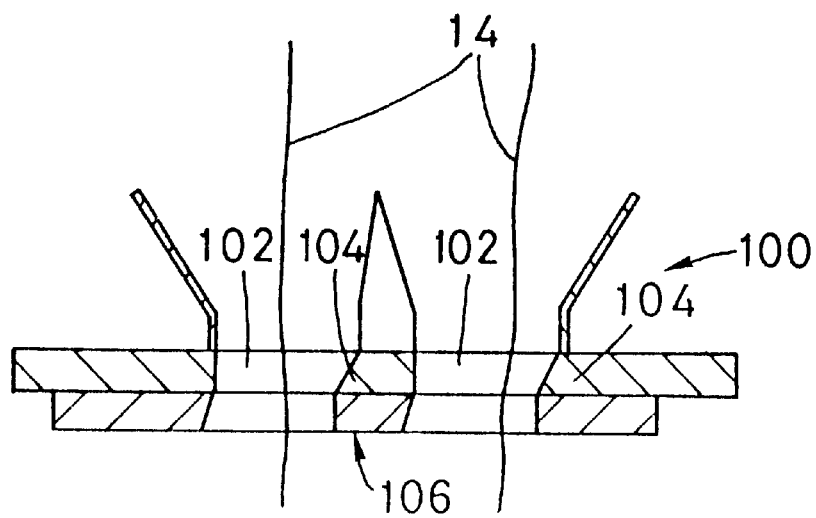
FIG. 14 is a side view showing yet other embodiments of first cutters or second cutters employed in the apparatus of the present invention and both (a) and (b) show how the cutters work.
Figure 14B:
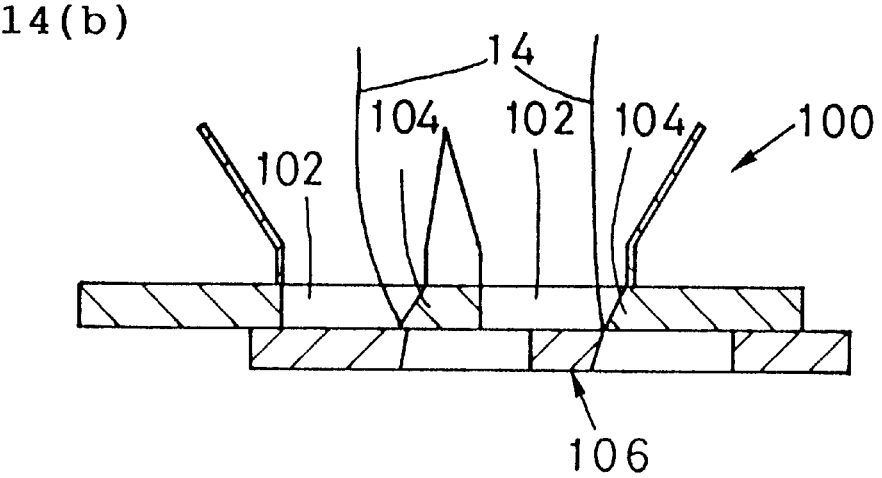

Starting from a state of allowing the passage of bunches of pasta 14 shown in FIG. 14(a), the cutter 100 causes the sliding blade 106 shown in FIG. 14(b) to slide itself to cut off the bunches of pasta 14, and then, immediately after completing the cutting operation, the sliding blade 106 is brought back to a state shown in FIG. 14(a) to enable the bunches of pasta 14 to pass through the hole 102.

Figure 15:
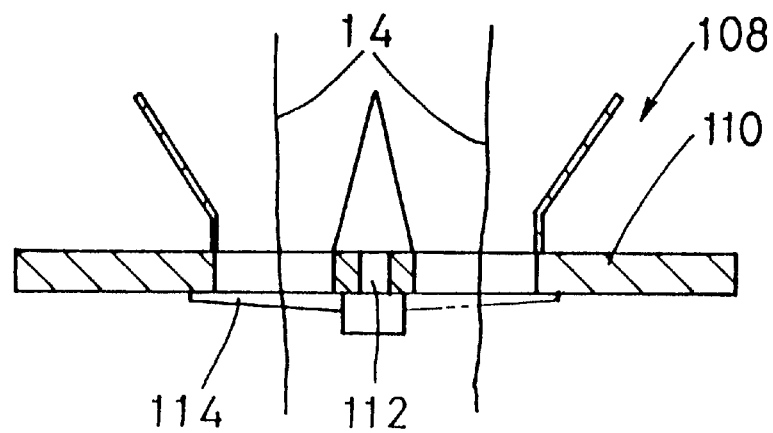
FIG. 15 is a side view showing another embodiment of first or second cutters employed in the apparatus of the present invention.

Further, as shown in FIG. 15, the cutter 108 of this embodiment is provided with a rotary blade 114 rotating around a shaft 111 with a fixed blade 110. In the case of the cutter 108, bunches of pasta 14 are cut off by causing the rotary blade 114 to be rotated.

Either of the above-cited cutters 100 or 108 can be used as the first cutter or the second cutter.

Figure 16:
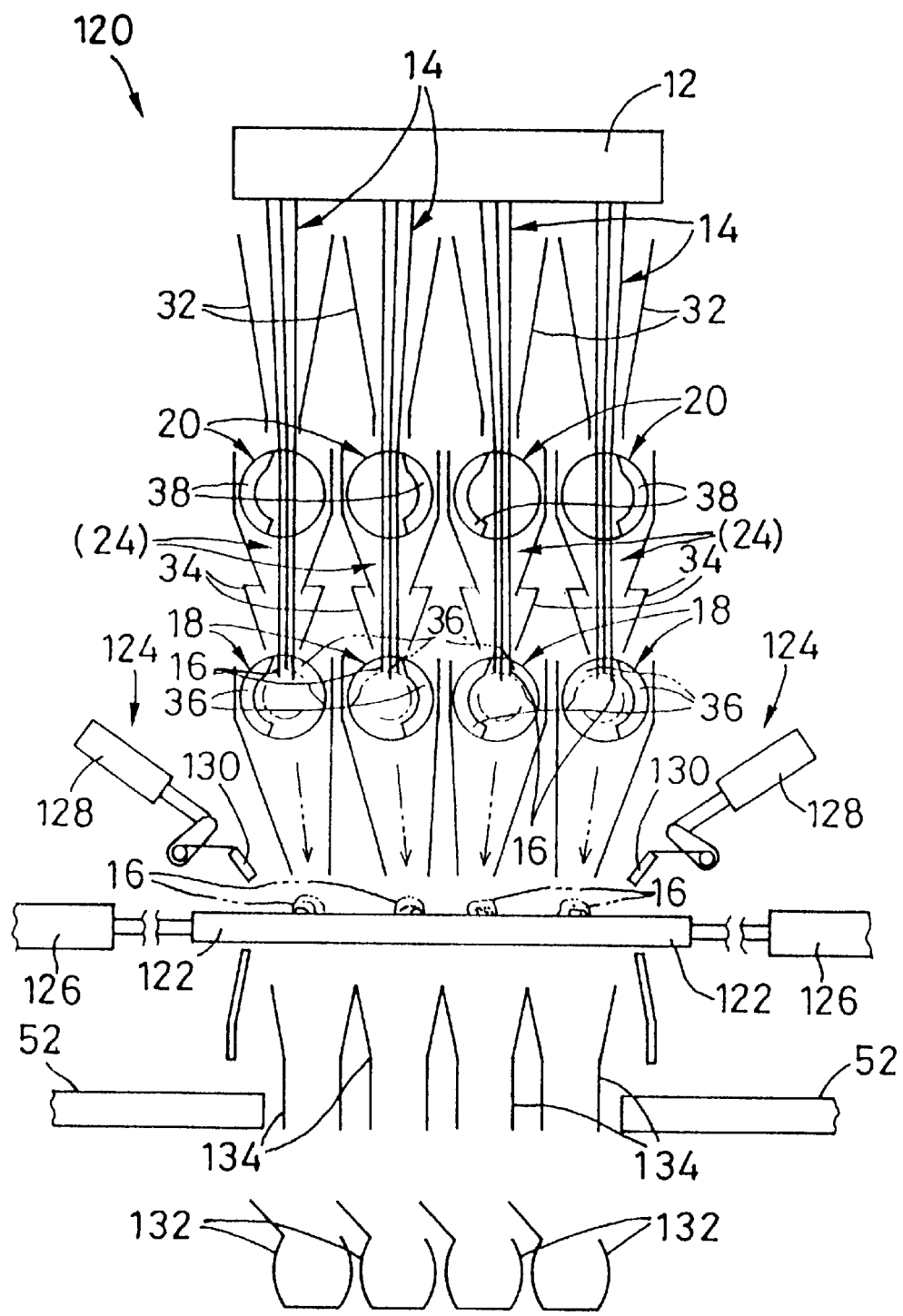
FIG. 16 is a side view of the apparatus for producing extruded elongate pasta products of substantially even lengths of the present invention and show how the apparatus works.
Figure 17:
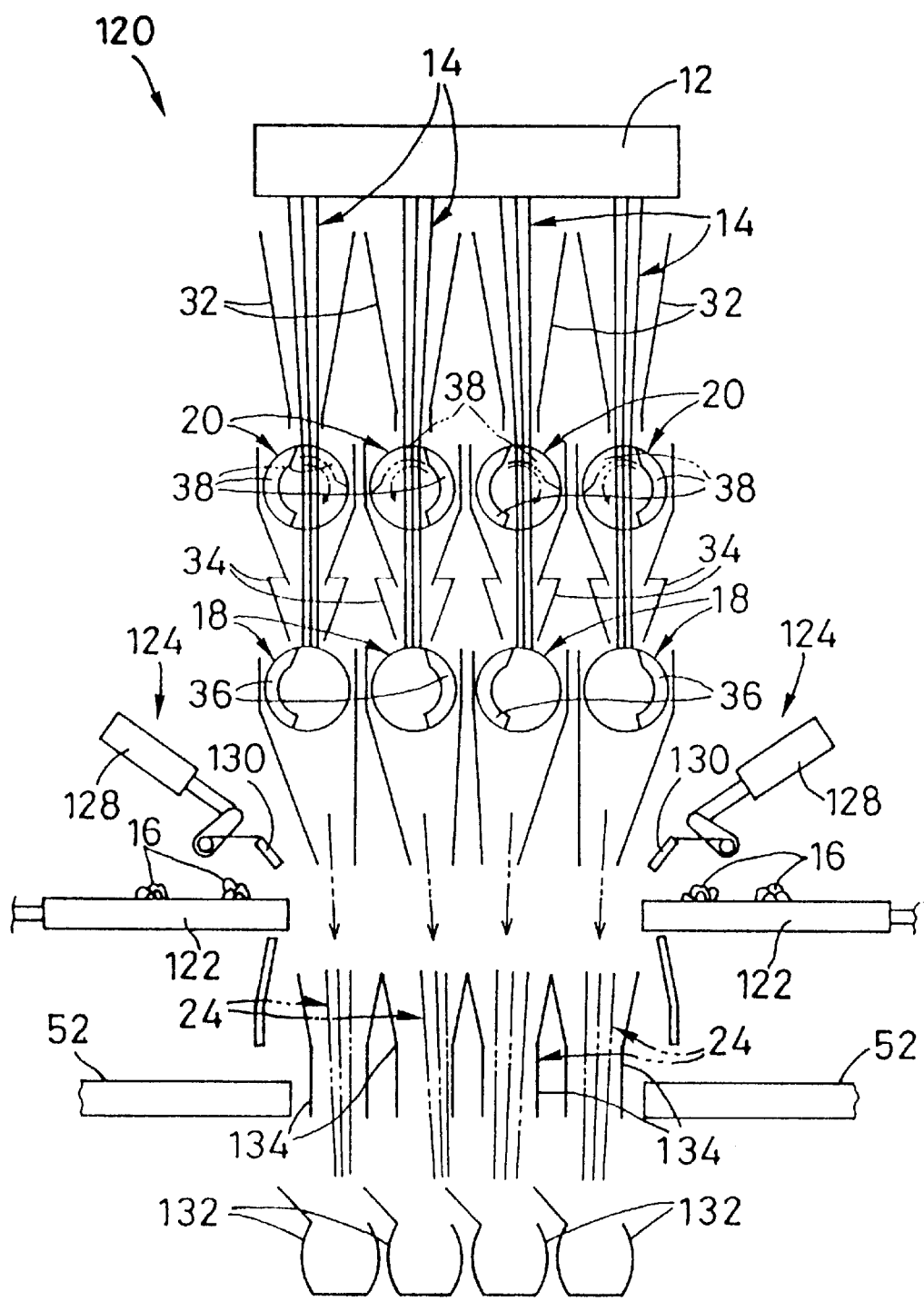
FIG. 17 is a side view showing how the apparatus of FIG. 16 works.
Figure 18:
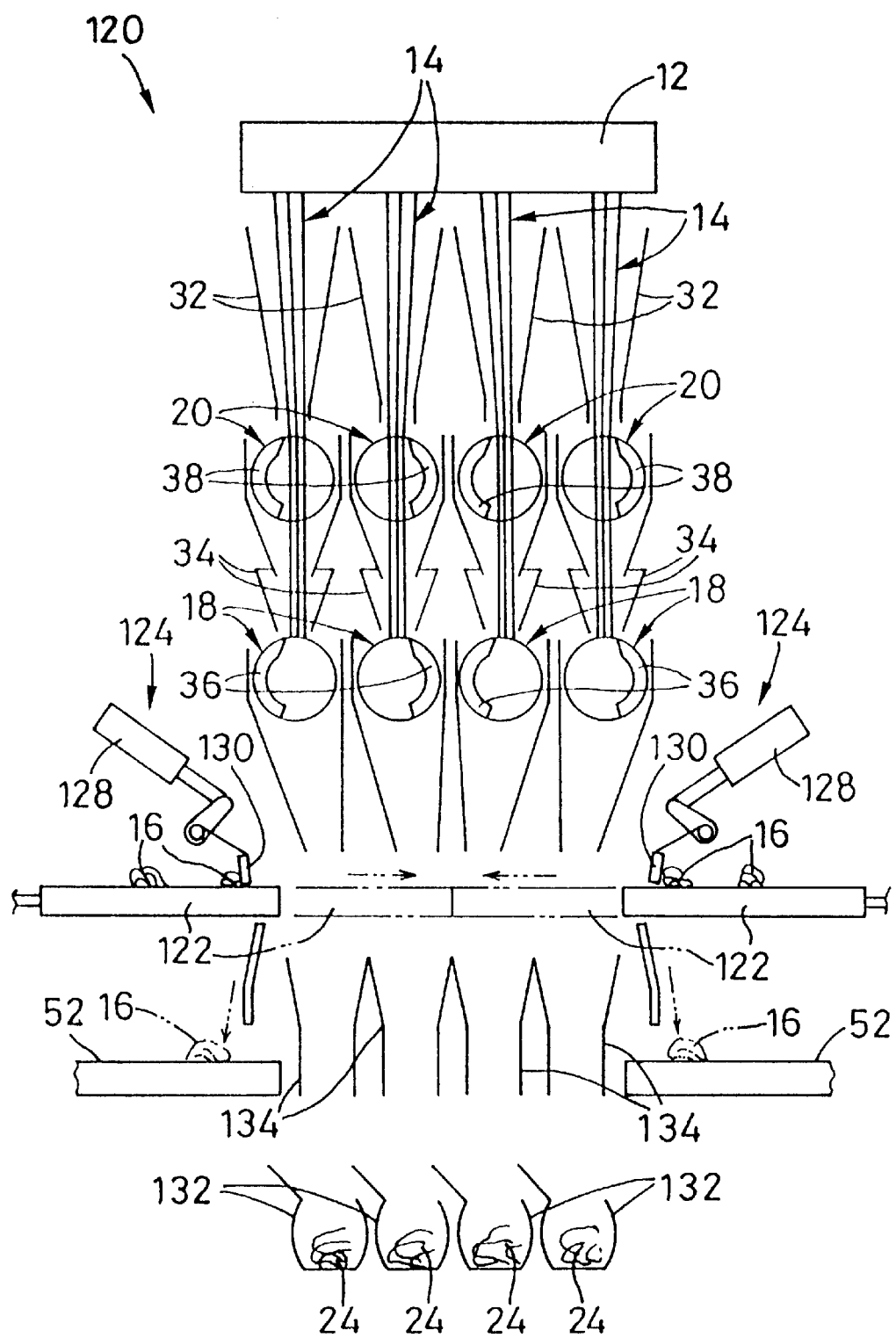
FIG. 18 is a side view showing how the apparatus of FIG. 16 works.
Figure 19A:
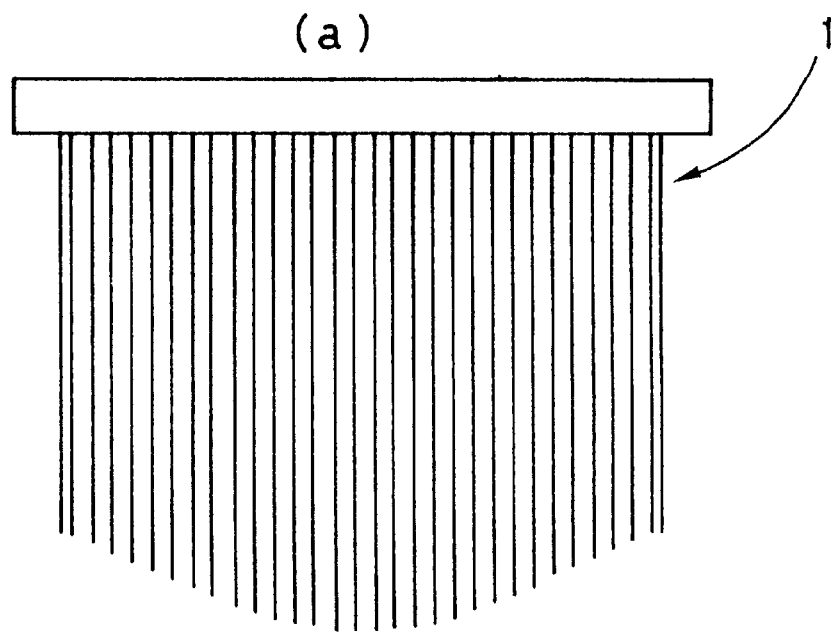
FIGS. 19A–19B is a front view of elongate pasta strings extruded from an extruder.
Figure 19B:
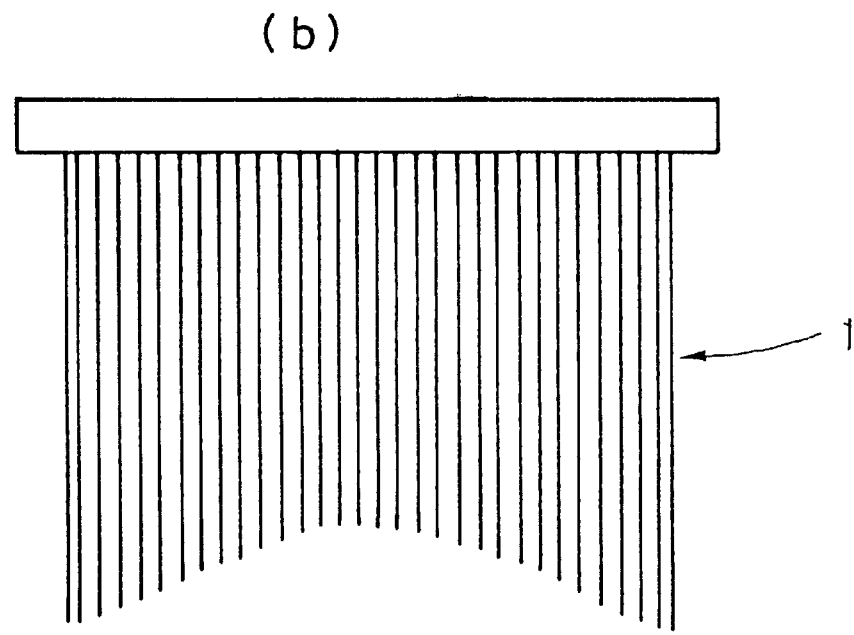

The apparatus for producing extruded elongate pasta of substantially even lengths of the present invention may be an apparatus 120 as exemplified in FIG. 16 through FIG. 18. The apparatus 120 for producing extruded elongate pasta of substantially even lengths is provided with a pallet 122 having a substantially horizontal upper-surface for mounting uneven tip portions 16 to be fallen thereon, and then uneven tip portions 16 are collected on a collecting conveyer 52 by causing the pallet 122 to move itself in the substantially horizontal direction. Further, the apparatus 120 is provided with a scraping device 124 for scraping out the uneven tip portions 16 mounted on the pallet 122 to fall them onto the collecting conveyer 52.

The pallet 122 is so structured that the uneven tip portions 16 mounted thereon can be shifted in the substantially horizontal direction by moving itself in the substantially horizontal direction via a cylinder 126. The scraping device 124 causes tip-end of an arm 130 to approach the pallet 122 by causing a cylinder 128 to rotatably move the arm 130.

As shown in FIG. 16, in the apparatus 120, a first cutter 18 is rotated as of the condition in which the bunches of elongate pasta 14 is extruded from an extruder. By causing the first cutter 18 to be rotated, the uneven tip portions 16 are cut off and fall themselves onto a pallet 122.

Next, as shown in FIG. 17, by causing a pallet 122 to reciprocate via a cylinder 126, the pallet 122 is shifted to the external portion from the upper portion of a stationary damper 134.

Simultaneous with the shift of the pallet 122 to the external positions, a second cutter 20 is rotated to cut off the bunches of elongate pasta 14, and then, the bunches of elongate pasta 24 each having a even length fall themselves onto a basket 132 after passing through the damper 134. Alternatively, the bunches of elongate pasta 24 having a even length passed through the damper 134 may be delivered to the following process via a conveyer without storing them inside of the basket 132.

The bunches of elongate pasta 24 fallen inside of the basket 132 are then subject to a boiling process as of the state being stored therein, and thus boiled bunches of elongate pasta are produced. In the boiling process, the bunches of elongate pasta 24 may be subject to boiling by unloading them from the basket 132. Preferably, the bunches of pasta 24 of even lengths having been boiled are externally delivered in the form of package being sealed. It is also permissible to produce fully dry elongate pasta from boiled bunches of elongate pasta 24 having a even length.

Next, as shown in FIG. 18, by causing the cylinder 128 to rotatably move the arm 130, the tip-end of the arm 130 approaches the pallet 122. By causing the pallet 122 to reciprocate while the tip-end of the arm 130 approaches the pallet 122, the uneven tip portions 16 on the pallet 122 are scraped off by the arm 130 and then placed on a collecting conveyer 52.

Since the present apparatus 120 for producing elongate pasta is thus provided with the pallet 122 widely extending below the chute 34, the uneven tip portions 16 of the pasta do not drop to places other than the pallet 122 but can be placed on the pallet 122 without fail. Furthermore, since the uneven tip portions 16 placed on the pallet 122 are scraped down to the collecting conveyor 52 by the scraping device 124, the uneven tip portions 16 can be prevented from adhering onto and remaining on the pallet 122. Accordingly, none of the uneven tip portions 16 enters the damper 134, and thus, the distribution performance can be improved.

The various embodiments of the apparatus and the method for producing elongate pasta according to the present invention are described with reference to the accompanying drawings so far, which do not limit the invention.

For example, materials for the present apparatus are not herein specified but can be any of appropriate materials such as a metal, a resin and ceramics. Furthermore, it goes without saying that the shape and the structure of the present apparatus can be appropriately modified, and that the aforementioned embodiments can be arbitrarily combined. It is noted that any of such combination of the embodiments is within the scope of the present invention. As another alternative, the cut of the uneven tip portions of the elongate pasta with the first cutter can be detected by using a sensor so as to operate the second cutter in accordance with the detected signal.

In addition, the cutter blades 36 and 38 shown in FIG. 1 can be made from a fine and strong wire such as a piano wire. Thus, it is to be understood that improvements, modifications and changes will be apparent to those skilled in the art without departing from the spirit of the present invention.

The present apparatus for producing elongate pasta of substantially even lengths comprises an elongate pasta extruder, a second cutter, a first cutter and sorting means disposed in this order in substantially a vertical direction. Therefore, bunches of elongate pasta having been extruded from and dangling from die holes of the extruder are substantially vertically arranged by their own weight. Thus, the bunches of the elongate pasta can be naturally aligned without applying an external force. The uneven tip portions of the extruded elongate pasta are cut with the first cutter and the resultant bunches of the elongate pasta are then cut in a predetermined position with the second cutter. In this manner, the bunches of elongate pasta of a substantially even length can be obtained. Since such operations can be stably repeated, the bunches of elongate pasta in the substantially even length can be mass-produced.

In one aspect of the apparatus for cutting elongate pasta, the bunches of elongate pasta extruded from the extruder are divided into groups each including a predetermined quantity of pasta, and hence, these groups of elongate pasta of an even quantity can be individually collected. Accordingly, the elongate pasta can be produced as individual meals of an even quantity.

In another aspect of the apparatus for cutting elongate pasta, one or both of the first cutter and the second cutter include a linear cutter blade rotated on a rotative body and a fixed blade to be geared with the linear cutter blade. In this manner, the cutter can be easily controlled so as to allow, for example, the cutter blade to intermittently rotate or to continuously rotate with the rotating speed appropriately varied. As a result, the bunches of elongate pasta can be cut at a desired timing. Additionally, since the rotating speed of the cutter blade can be easily increased, the apparatus is advantageous to the mass production. Moreover, the cutter only occupies a projected area of the rotative body on which the cutter blade is rotated. Therefore, the apparatus itself can be made compact, resulting in increasing the production per unit facility area.

Alternatively, in the apparatus for producing elongate pasta, one or both of the first cutter and the second cutter include a linear cutter blade disposed swingably around an axis center and a fixed blade to be geared with the linear cutter blade. In this manner, the cutter blade can be appropriately swung in connection with the speed of extruding the elongate pasta from the extruder. As a result, the bunches of elongate pasta can be cut at a desired timing.

In the apparatus wherein at least the first cutter consists of a linear cutter blade disposed swingably around an axis center and a fixed blade to be geared with the linear cutter blade, the sorting means includes a receiving member integrated with the cutter blade of the first cutter, so as to allow the receiving member to swing together with the cutter blade. In this manner, the uneven tip portions having been cut with the first cutter can be placed on the receiving member. Accordingly, the bunches of elongate pasta having been cut into the even length with the second cutter are allowed to drop to a place other than the receiving member, and can be prevented from being mixed with the uneven tip portions cut with the first cutter.

In still another aspect of the apparatus for producing elongate pasta, a distance between the first cutter and the second cutter is changeable. Therefore, the even length into which the bunches of elongate pasta are cut can be arbitrarily adjusted.

In still another aspect of the apparatus for producing elongate pasta, the sorting means includes a selectively distributing damper, so that the uneven tip portions having been cut with the first cutter can be collected in collecting means and the bunches of elongate pasta having been cut into the even length with the second cutter can be stored in storing means. In this manner, the cut pasta can be rapidly sorted merely through the distributing operation by using the damper.

In still another aspect, the apparatus for producing elongate pasta can further comprise a pallet substantially horizontally disposed below the first cutter, and the cut uneven tip portions are placed on the pallet so as to be collected by moving the pallet in a substantially horizontal direction. In this manner, the uneven tip portions having been cut with the first cutter can be definitely placed on the pallet to be collected. Furthermore, the apparatus can further comprise scraping means for scraping the uneven tip portions placed on the pallet to be fed to the collecting means. Thus, the uneven tip portions can be prevented fram adhering onto and remaining on the pallet. In this manner, the uneven tip portions can be prevented from entering the storing means and being mixed with the bunches of elongate pasta of the even length, resulting in improving the distribution performance.

The present method of producing elongate pasta of substantially even lengths can realize mass production. Also, in this method, bunches of elongate pasta successively extruded from the extruder can be divided into groups each including a predetermined quantity of elongate pasta and the respective groups of elongate pasta having been cut into the substantially even length can be individually stored. Thus, elongate pasta of an even length divided into individual meal can be mass-produced.

What is claimed is:

1. An apparatus for producing extruded elongate pasta of substantially even lengths comprising:

an extruder for forming elongate pasta;

a first cutter for cutting tip portions of bunches of elongate pasta having been extruded from and dangling from said extruder;

a second cutter for cutting the bunches of the elongate pasta, whose tip portions have been cut, into an even length; and a sorting means for selectively sorting the bunches of elongate pasta having been cut into the even length with the second cutter from the tip portions having been cut with the first cutter, wherein said extruder, said second cutter, said first cutter and said sorting means are disposed in this order from a top to a bottom in substantially a vertical direction.

2. The apparatus for producing extruded elongate pasta of substantially even lengths according to claim 1, wherein the bunches of elongate pasta extruded from said extruder are each of a predetermined quantity, and the apparatus further comprises means for individually storing the groups of the bunches of elongate pasta having been cut into said even lengths.

3. The apparatus for producing extruded elongate pasta of substantially even lengths according to claim 1, wherein one or both of the first cutter and the second cutter consist of a linear cutter blade rotated on a rotative body and a fixed blade to be geared with said linear cutter blade.

4. The apparatus for producing extruded elongate pasta of substantially even lengths according to claim 2, wherein one or both of the first cutter and the second cutter consist of a linear cutter blade rotated on a rotative body and a fixed blade to be geared with said linear cutter blade.

5. The apparatus for producing extruded elongate pasta of substantially even lengths according to claim 1, wherein one or both of the first cutter and the second cutter consist of a linear cutter blade disposed swingably around an axis center and a fixed blade to be geared with the linear cutter blade.

6. The apparatus for producing extruded elongate pasta of substantially even lengths according to claim 2, wherein one or both of the first cutter and the second cutter consist of a linear cutter blade disposed swingably around an axis center and a fixed blade to be geared with the linear cutter blade.

7. The apparatus for producing extruded elongate pasta of substantially even lengths according to claim 1, further comprises means for variously adjusting the distance between the first cutter and the second cutter.

8. The apparatus for producing extruded elongate pasta of substantially even lengths according to claim 1, wherein said sorting means includes a damper for selectively distributing the tip portions having been cut with the first cutter to collecting means and the bunches of elongate pasta having been cut into the even length with the second cutter to storing means, and the damper is interlocked with the movement of the first cutter and the second cutter.

9. The apparatus for producing extruded elongate pasta of substantially even lengths according to claim 4, wherein said sorting means includes a damper for selectively distributing the tip portions having been cut with the first cutter to collecting means and the bunches of elongate pasta having been cut into the even length with the second cutter to storing means, and the damper is interlocked with the movement of the first cutter and the second cutter.

10. The apparatus for producing extruded elongate pasta of substantially even lengths according to claim 1, wherein the sorting means includes a substantially-horizontal pallet disposed below the first cutter, and the tip portions having been cut with the first cutter are placed on the pallet and collected by the movement of the pallet in a substantially horizontal direction.

11. The apparatus for producing extruded elongate pasta of substantially even lengths according to claim 4, wherein the sorting means includes a substantially-horizontal pallet disposed below the first cutter, and the tip portions cut with the first cutter are placed on the pallet and collected, with a collecting means, by the movement of the pallet in a substantially horizontal direction.

12. The apparatus for producing extruded elongate pasta of substantially even lengths according to claim 11, further comprising scraping means for scraping out tip portions placed on the pallet to be fed to the collecting means.

13. The apparatus for producing extruded elongate pasta of substantially even lengths according to claim 5, wherein at least the first cutter consists of a linear cutter blade disposed swingably around an axis center and a fixed blade to be geared with the linear cutter blade, the sorting means includes a receiving member for supporting the cutter blade of the first cutter and for collecting the tip portions having been cut with the first cutter, and the receiving member is swingable together with the cutter blade of the first cutter.

14. A method for producing extruded elongate pasta of substantially even lengths comprising the steps of:
- cutting tip portions of bunches of elongate pasta having been successively extruded from and dangling from an extruder for forming elongate pasta; and
- cutting the bunches of elongate pasta, whose tip portions have been cut, in a predetermined position,
- wherein the steps are repeatedly executed, whereby bunches of elongate pasta of a substantially even length are produced.

15. The method for producing extruded elongate pasta of substantially even lengths according to claim 14,
- wherein the bunches of elongate pasta successively extruded from and dangling from said extruder are divided into groups each of a predetermined quantity, and the groups of the bunches of elongate pasta having been cut into the substantially even length are individually stored.

16. A method for producing extruded elongate pasta of substantially even lengths comprising the steps of extruding pasta dough from a die to form bunches of elongate pasta having tip portions, continuously operating a first cutter so as to constantly cut the tip portions of the bunches of elongate pasta, intermittently halting the first cutter at a predetermined interval during which said tip portions are substantially cut and operating a second cutter while the first cutter is being halted so as to cut the bunches of elongate pasta, whose tip portions have been cut, in a predetermined position, whereby the bunches of elongate pasta of a substantially even length are produced.

* * * * *